US009243847B2

(12) United States Patent
Benz et al.

(10) Patent No.: US 9,243,847 B2

(45) Date of Patent: Jan. 26, 2016

(54) HYBRID HEAT EXCHANGE APPARATUS

(75) Inventors: Steven M. Benz, Laurel, MD (US); Trevor H. Hegg, Westminster, MD (US); Thomas William Bugler, III, Frederick, MD (US); Davey Joe Vadder, Manchester, MD (US)

(73) Assignee: Evapco, Inc., Taneytown, MD (US)

( * ) Notice: Subject to any disclaimer, the term of this patent is extended or adjusted under 35 U.S.C. 154(b) by 1355 days.

(21) Appl. No.: 12/907,162

(22) Filed: Oct. 19, 2010

(65) Prior Publication Data

US 2011/0100593 A1 May 5, 2011

Related U.S. Application Data

(60) Provisional application No. 61/258,004, filed on Nov. 4, 2009.

(51) Int. Cl.

*F24F 3/14* (2006.01)
*F28D 5/02* (2006.01)
*F28B 1/06* (2006.01)

(Continued)

(52) U.S. Cl.

CPC ... *F28D 5/02* (2013.01); *F28B 1/06* (2013.01); *F28C 1/06* (2013.01); *F28C 1/14* (2013.01); *F28D 1/0477* (2013.01);

(Continued)

(58) Field of Classification Search

CPC ................ F28C 1/14; F28C 1/16; F28C 1/02; F28C 1/00; F28C 2001/145; F28F 27/006; F28F 27/02; F28F 25/02; F28D 15/00

USPC .......... 165/48.1, 60, 101, 103, 110, 117, 122, 165/132, 175, 222, 226, 228, 900; 62/310, 62/413; 261/112, 152, 153, 155, 159, 305

See application file for complete search history.

(56) References Cited

U.S. PATENT DOCUMENTS 2,139,262 A * 12/1938 Euwer .............................. 165/59
2,418,619 A 4/1947 Brown (Continued)

FOREIGN PATENT DOCUMENTS

DE 19521814 C1 11/1996
JP 60-089682 A 5/1985

(Continued)

OTHER PUBLICATIONS

Evapco, Inc. Engineering Drawing No. H983644-03GA dated Jul. 9, 1998.

(Continued)

*Primary Examiner* — Travis Ruby

(74) *Attorney, Agent, or Firm* — Panitch Schwarze Belisario & Nadel LLP

(57) ABSTRACT

Heat is indirectly transferred between a process fluid and ambient air in apparatus that includes an evaporative heat transfer cell operative in a wet mode or a dry mode, a dry heat transfer cell and a fan. The air may bypass the dry heat transfer cell to flow through a first air passage or may flow through a second air passage through the dry heat transfer cell and in either event, then through the evaporative heat transfer cell. The air may partially flow through and partially bypass the dry heat transfer cell, and then through the evaporative heat transfer cell. The evaporative heat transfer cell optionally may include a direct contact evaporative heat exchanger.

19 Claims, 12 Drawing Sheets

(51) Int. Cl.
*F28C 1/06* (2006.01)
*F28C 1/14* (2006.01)
*F28D 1/047* (2006.01)
*F28F 1/36* (2006.01)
*F28F 27/00* (2006.01)

(52) U.S. Cl.
CPC ............... *F28D 1/0478* (2013.01); *F28F 1/36* (2013.01); *F28F 27/003* (2013.01); *F28F 2250/06* (2013.01)

(56) References Cited

U.S. PATENT DOCUMENTS

| | | | | | |
|---|---|---|---|---|---|
| 2,680,603 | A | * | 6/1954 | Taylor | 261/22 |
| 3,252,508 | A | * | 5/1966 | Goettl | 165/48.1 |
| 3,427,427 | A | | 2/1969 | Rudd | |
| 3,773,241 | A | | 11/1973 | Norris | |
| 3,831,667 | A | | 8/1974 | Kilgore et al. | |
| 3,900,301 | A | * | 8/1975 | Constantinescu et al. | 96/244 |
| 3,903,212 | A | * | 9/1975 | Lefevre | 261/30 |
| 3,925,523 | A | | 12/1975 | Cates | |
| 4,033,406 | A | | 7/1977 | Basiulis | |
| 4,076,771 | A | | 2/1978 | Houx, Jr. et al. | |
| 4,102,027 | A | | 7/1978 | Greever et al. | |
| 4,107,832 | A | | 8/1978 | Joekel et al. | |
| 4,112,027 | A | | 9/1978 | Cates | |
| 4,224,984 | A | | 9/1980 | Miyata et al. | |
| 4,227,572 | A | | 10/1980 | Harlan | |
| 4,236,299 | A | | 12/1980 | Joekel et al. | |
| 4,315,873 | A | * | 2/1982 | Smith et al. | 261/158 |
| 4,429,558 | A | | 2/1984 | Murakami et al. | |
| 4,450,902 | A | * | 5/1984 | Bosne | 165/82 |
| 4,488,344 | A | | 12/1984 | McCurley | |
| 4,755,331 | A | | 7/1988 | Merrill et al. | |
| 4,949,543 | A | | 8/1990 | Cottone et al. | |
| 5,092,038 | A | | 3/1992 | Geppelt et al. | |
| 5,253,701 | A | | 10/1993 | Leidinger | |
| 5,425,414 | A | | 6/1995 | Bradley, Jr. et al. | |
| 5,435,382 | A | | 7/1995 | Carter | |
| 5,449,036 | A | * | 9/1995 | Genge et al. | 165/104.19 |
| 5,799,725 | A | | 9/1998 | Bradley, Jr. et al. | |
| 5,816,318 | A | | 10/1998 | Carter | |
| 5,927,393 | A | | 7/1999 | Richter et al. | |
| 6,142,219 | A | | 11/2000 | Korenic et al. | |
| 6,213,200 | B1 | | 4/2001 | Carter et al. | |
| 6,598,862 | B2 | | 7/2003 | Merrill et al. | |
| 7,296,620 | B2 | | 11/2007 | Bugler, III et al. | |
| 7,310,958 | B2 | | 12/2007 | Carter et al. | |
| 2007/0227707 | A1 | | 10/2007 | Machiroutu et al. | |
| 2007/0240445 | A1 | | 10/2007 | Morrison et al. | |
| 2009/0188650 | A1 | | 7/2009 | Morgan et al. | |

FOREIGN PATENT DOCUMENTS

| | | | |
|---|---|---|---|
| JP | 03-117888 | A | 5/1991 |
| WO | 9930096 | A1 | 6/1999 |

OTHER PUBLICATIONS

Evapco, Inc. Engineering Drawing No. H983644-04GA dated Jul. 9, 1998.

Evapco, Inc. Engineering Drawing No. H5284989-01SA dated Dec. 4, 2007.

Invitation to Pay Additional Fees with attached Int'l Search Report issued Dec. 30, 2011 in Int'l Application No. PCT/US2010/053158.

Int'l Search Report issued Feb. 20, 2012 in Int'l Application No. PCT/US2010/053158; Written Opinion.

Extended European Search Report issued Mar. 21, 2014 in EP Application No. 13196749.9.

* cited by examiner

10

10'

1st Mode - Coldest
Indirect Contact X-Changer Always Dry and Always Second
Direct Contact X-Changer 50 Dry
First Indirect Contact X-Changer 28 Dry First Indirect Contact X-Changer 28 Wet
2nd Mode Moderate
Direct Contact X-Changer Dry 3rd Mode Hot
Direct Contact X-Changer Wet
First Indirect Contact X-Changer 28 Wet

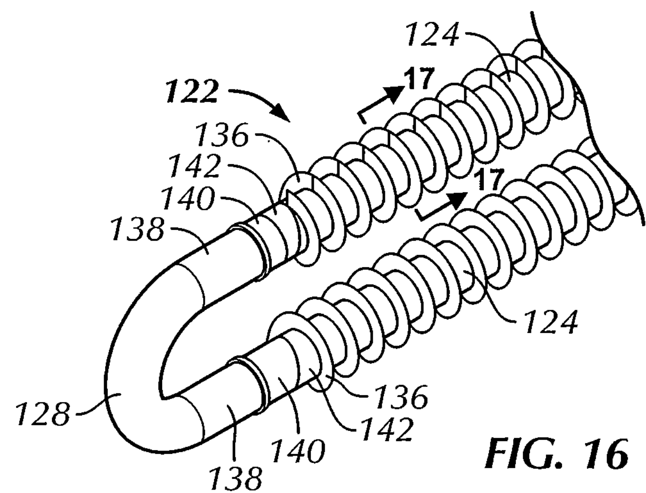
FIG. 16
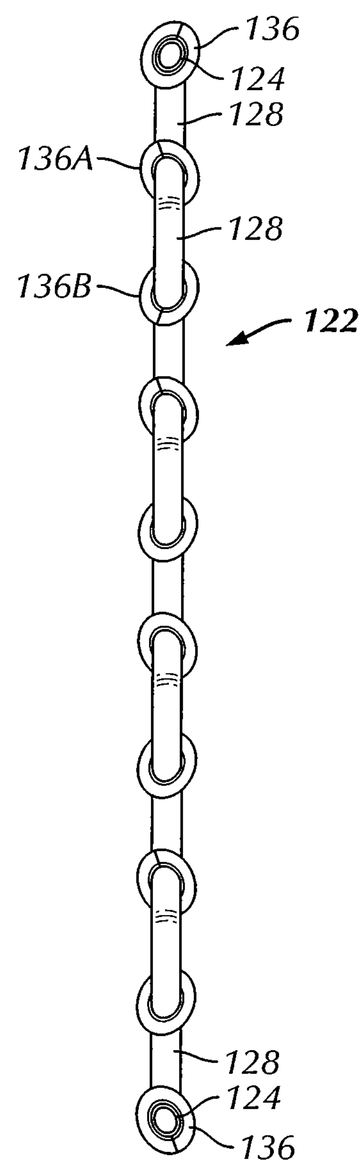
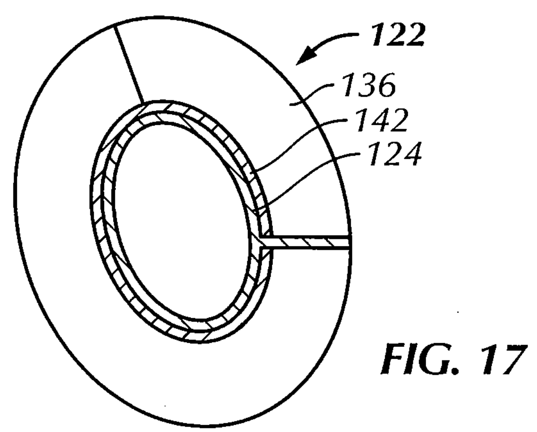
FIG. 17
FIG. 18

HYBRID HEAT EXCHANGE APPARATUS

CROSS-REFERENCE TO RELATED APPLICATION

This application claims the benefit under 35 U.S.C. §119 (e) of U.S. Provisional Patent Application No. 61/258,004, filed Nov. 4, 2009, the disclosure of which is hereby incorporated herein by reference in its entirety.

BACKGROUND OF THE INVENTION

The present invention relates to a hybrid heat exchange apparatus or unit that may be used in different modes as a dry, sensible-heat transfer unit or as an evaporative, latent heat transfer unit, or in a combination mode using both the evaporative and dry cell operation modes, and typically may be used as a condenser to condense gaseous process fluid or as a cooler to cool process fluid in the form of a liquid or non-condensable gas at the temperatures and pressures at which the apparatus is operating.

More particularly, the present invention relates to a hybrid heat exchange apparatus for indirectly transferring heat between a process fluid and ambient air and includes an evaporative heat transfer cell operative in a wet mode or a dry mode, a dry heat transfer cell and a fan for moving air from the ambient atmosphere through the apparatus. The apparatus may be controlled manually or automatically for turning on or off a distributor assembly of cooling liquid in the evaporative heat transfer cell and for controlling air flow through the apparatus. Air is controlled to bypass the dry heat transfer cell to flow through a first air passage or to flow through a second air passage through the dry heat transfer cell and then through the evaporative heat transfer cell. The air flow from the first or second air passages then flows through the evaporative heat transfer cell. The system controller also may allow the air to partially flow through and partially bypass the dry heat transfer cell and then flow through the evaporative heat transfer cell. In another embodiment, ambient air from the first or second air passages may then pass through direct contact evaporative heat exchanger in the evaporative heat transfer cell, while ambient air also flows through a third air passage directly from the ambient atmosphere through an indirect first process fluid coil assembly in the evaporative heat transfer cell. By controlling the flow based on ambient temperature and humidity conditions, the most efficient and economical control of the hybrid heat exchange apparatus can be achieved, while also avoiding potential icing and freezing problems that could otherwise exist in freezing conditions.

Various types of heat exchange apparatus are used in a variety of industries, from simple building air conditioning to industrial processing such as petroleum refining, power plant cooling, and other industries. Typically, in indirect heat exchange systems, a process fluid used any of such or other applications is subject to heating or cooling by passing internally through a coil assembly made of heat conducting material, typically a metal, such as aluminum, copper, galvanized steel or stainless steel. Heat is transferred through the walls of the heat conducting material of the coil assembly to the ambient atmosphere, or in a heat transfer apparatus, to other heat transfer fluid, typically air and/or water flowing externally over the coil assembly where heat is transferred, usually from hot processing fluid internally within the coil assembly to the cooling heat transfer fluid externally of the coil assembly, by which the processing fluid is cooled and the heat transfer fluid is warmed.

In one type of indirect heat transfer, heat is transferred to the atmosphere by dry or sensible heat transfer cells, where there are two fluids: a gas, typically in the form of an air stream externally flowing through a coil assembly of tubes, and a process fluid flowing internally through a coil assembly, which usually have fins to help dissipate the heat. Sensible heat is exchanged as the air stream passes over the coil assembly containing the process fluid stream. As used herein, this type of heat exchanger will be referred to as a "dry heat transfer cell."

In another type of indirect heat transfer, heat is transferred using indirect evaporative exchange, where there are three fluids: a gas, typically in the form of an air stream, a process fluid flowing internally through a coil assembly of tubes, and an evaporative cooling liquid, typically water, which is distributed over the exterior of the coil assembly through which the process fluid is flowing and which also contacts and mixes with the air or other gas flowing externally through the coil assembly. The process fluid first exchanges sensible heat with the evaporative liquid through indirect heat transfer between the tubes of the coil assembly, since it does not directly contact the evaporative liquid, and then the air stream and the evaporative liquid exchange heat and mass when they contact each other, resulting in more evaporative cooling. Because a cooling liquid is used, sometimes this type of heat exchange is known as a wet type of heat exchange. As used herein, this type of heat exchanger will be referred to as an "indirect evaporative heat transfer cell."

In other embodiments of an evaporative heat transfer cell, air or other gas and water or other cooling liquid may be passed through direct heat transfer media, called wet deck fill, where the water or other cooling liquid is then distributed as a thin film over the extended fill surface for maximum cooling efficiency. The air and water contact each other directly across the fill surface, whereupon a small portion of the distributed water is evaporated, resulting in direct evaporative cooling of the water, which is usually collected in a sump for recirculation over the wet deck fill and any coil assembly used in the apparatus for indirect heat exchange. As used herein, this type of heat exchanger will be referred to as a "direct contact evaporative heat exchanger."

As used herein, the term "evaporative heat transfer cell" refers generically to either or both of an "indirect evaporative heat transfer cell," and to a "direct contact evaporative heat exchanger" unless one type is specified or described more specifically. In evaporative heat transfer cells, the water or other cooling liquid and the air or other gas involved may flow in a concurrent flow (where the liquid and gas flow in the same direction), a countercurrent flow (where the liquid and gas flow in opposite directions, typically the liquid flowing downwardly and the gas flowing upwardly), or a cross-current flow, sometimes referred to as "cross flow," (where the liquid and gas flow generally transversely with respect to each other, typically the liquid flowing downwardly and the gas flowing across, sideways or generally transverse to the liquid flow direction).

Both dry and evaporative heat transfer cells are commonly used to reject heat as coolers or condensers. Thus, the apparatus of the present invention may be used as a cooler, where the process fluid is a single phase fluid, typically liquid, and often water, although it may be a non-condensable gas at the temperatures and pressures at which the apparatus is operating. The apparatus of the present invention may also be used as a condenser, where the process fluid is a two-phase or a multi-phase fluid that includes a condensable gas, such as ammonia or FREON® refrigerant or other refrigerant in a condenser system at the temperatures and pressures at which the apparatus is operating, typically as part of a refrigeration system where the process fluid is compressed and then evaporated to provide the desired refrigeration. Where the apparatus is used as a condenser, the condensate is collected in one or more condensate receivers or is transferred directly to the associated refrigeration equipment having an expansion valve or evaporator where the refrigeration cycle begins again.

In most climates, evaporative heat transfer cells offer significant process efficiency improvements over dry heat transfer cells. Evaporative coolers reject heat at temperatures approaching the lower ambient wet bulb temperatures, while dry coolers are limited to temperatures approaching the higher ambient dry bulb temperatures. In climates of lower relative humidity, the ambient wet bulb temperature may be 15° F. (−9.4° C.) to 30° F. (−1.1° C.) below the ambient design dry bulb temperature. As a result, in an evaporative cooler, the evaporative liquid stream may reach a temperature significantly lower than the ambient dry bulb temperature, offering the opportunity to increase the efficiency of the cooling process and to lower the overall process energy requirements. Evaporative condensers offer similar possibilities for increased efficiency and lower energy requirements. However, even in view of potentially increased process efficiencies and lower overall process energy requirements, evaporative cooling and evaporative condensing are often not used due to concern about consumption from evaporation of water typically used as the evaporative liquid, and the potential for the water to freeze during cold weather operation.

When designing heat exchange apparatus, both dry heat transfer cells and evaporative heat transfer cells are usually sized to perform their required heat transfer duty under the most challenging thermal conditions, typically expressed as the summer design wet bulb or dry bulb temperature. While it is often critical that the heat exchange apparatus be able to transfer the required amount of heat at these design conditions, the duration of these elevated atmospheric temperatures may account for as little as 1% of the time that the apparatus is operating. The remainder of the time, the apparatus has more capacity than required, resulting in the waste of energy and evaporative liquid.

The present invention, a hybrid heat exchange apparatus, provides more efficient heat transfer, typically cooling by heat rejection, most effectively but not exclusively, at low ambient temperature and low relative humidity, while avoiding freezing and ice formation in the apparatus.

DEFINITIONS

In addition to the definitions set forth elsewhere herein, the following definition relate to the invention described and claimed in this application.

As used herein, the singular forms “a”, “an”, and “the” include plural referents, and plural forms include the singular referent unless the context clearly dictates otherwise.

Certain terminology is used in the following description for convenience only and is not limiting. Words designating direction such as “bottom,” “top,” “front,” “back,” “left,” “right” and “sides” designate directions in the drawings to which reference is made, but are not limiting with respect to the orientation in which the invention and its components and apparatus may be used. The terminology includes the words specifically mentioned above, derivatives thereof and words of similar import.

As used herein, the term “about” with respect to any numerical value, means that the numerical value has some reasonable leeway and is not critical to the function or operation of the component being described or the system or subsystem with which the component is used, and will include values within plus or minus 5% of the stated value.

As used herein, the term “generally” or derivatives thereof with respect to any element or parameter means that the element has the basic shape, or the parameter has the same basic direction, orientation or the like to the extent that the function of the element or parameter would not be materially adversely affected by somewhat of a change in the element or parameter. By way of example and not limitation, the segments having a “generally elliptical cross-sectional shape” refers not only to a cross-section of a true mathematical ellipse, but also to oval cross-sections or somewhat squared corner cross-sections, or the like, but not a circular cross-section or a rectangular cross-section. Similarly, an element that may be described as “generally normal” to or “generally parallel to” another element can be oriented a few degrees more or less than exactly 90° with respect to “generally normal” and a few degrees more or less than exactly perfectly parallel or 0° with respect to “generally parallel,” where such variations do not materially adversely affect the function of the apparatus.

As used herein, the term “substantially” with respect to any numerical value or description of any element or parameter means precisely the value or description of the element or parameter but within reasonable industrial manufacturing tolerances that would not adversely affect the function of the element or parameter or apparatus containing it, but such that variations due to such reasonable industrial manufacturing tolerances are less than variations described as being “about” or “generally.” By way of example and not limitation, “fins having a height extending from the outer surface of the segments a distance of substantially 23.8% to substantially 36% of the nominal tube outside diameter” would not allow variations that adversely affect performance, such that the fins would be too short or too tall to allow the evaporative heat exchanger to have the desired enhanced performance.

As used herein, the term “thickness” with respect to the thickness of the fins, refers to the thickness of the fins prior to treatment after the fins are applied to the tubes to make the finned tubes, such as galvanizing the tubes or the coil assembly using the filmed tubes, as such treatment would likely affect the nominal thickness of the fins, the nominal fin height and the nominal spacing of the fins. Thus, all of the dimensions set forth herein are of the finned tubes prior to any later treatment of the finned tubes themselves or of any coil assembly containing them.

As used herein, where specific dimensions are presented in inches and parenthetically in centimeters (cm), the dimensions in inches controls, as the centimeter dimensions were calculated based on the inches dimensions by multiplying the inches dimensions by 2.54 cm per inch and rounding the centimeter dimensions to no more than three decimal places.

BRIEF SUMMARY OF THE INVENTION

One aspect of the present invention relates to a hybrid heat exchange apparatus for indirectly transferring heat between a process fluid and ambient air, the apparatus comprising an evaporative heat transfer cell operative in a wet or dry mode; an indirect dry heat transfer cell; and a fan for causing air to flow from the ambient atmosphere through the apparatus; the apparatus being manually or automatically controllable for turning on or off a distributor assembly of cooling liquid in the evaporative heat transfer cell and for controlling air flow through a first air passage to bypass the dry heat transfer cell to flow through the evaporative heat transfer cell, or through a second air passage through the dry heat transfer cell and then through the evaporative heat transfer cell, or to partially bypass the dry heat transfer cell through the first air passage and partially flow through the second air passage, any air flowing through the first or second air passage then flowing through the evaporative heat transfer cell.

The evaporative heat transfer cell comprises an indirect evaporative heat transfer cell with a first process fluid coil assembly through which the process fluid flows internally within the first process fluid coil assembly and includes a first process fluid inlet header and a first process fluid outlet header; the distributor assembly for selectively distributing cooling liquid from a source externally over the first process fluid coil assembly; and the fan for moving air externally through the first process fluid coil assembly and the apparatus.

The dry heat transfer cell comprises a second process fluid coil assembly through which the process fluid flows internally within the second process fluid coil assembly and air may selectively flow externally through the second process fluid coil assembly, the second process fluid coil assembly including a second process fluid inlet header and a second process fluid outlet header.

The apparatus is operable in first, second, third and fourth modes, depending on the temperature of the ambient air and the ambient humidity, as follows:

In the first mode, when the temperature of the ambient air is sufficiently warm that there is little likelihood that the cooling liquid will freeze and ambient conditions of temperature and humidity are such that evaporative heat transfer will be effective, selectably openable and closeable air inlet dampers are open, such that the ambient air bypasses the dry heat transfer cell and flows through the evaporative heat transfer cell with the distributor assembly of cooling liquid turned on.

In the second mode, when the temperature of the ambient air is likely to freeze the cooling liquid, the air inlet dampers are closed, such that the ambient air flows through the dry heat transfer cell and then through the evaporative heat transfer cell with the distributor assembly of cooling liquid turned off.

In the third mode, when the temperature of the ambient air is warmer than in the second mode, and ambient conditions of temperature and humidity are such that evaporative heat transfer and dry heat transfer will be effective, the air inlet dampers are closed, such that the ambient air flows through the dry heat transfer cell, increasing the temperature of the ambient air to provide heated air such that the cooling liquid in contact with the heated air is not likely to freeze, and then through the evaporative heat transfer cell with the distributor assembly of cooling liquid turned on.

In the fourth mode, when the temperature of the ambient air is warmer than in the third mode, and ambient conditions of temperature and humidity are such that evaporative heat transfer and dry heat transfer will be effective, the air inlet dampers are partially open, such that some of the ambient air passes through the dry heat transfer cell and some of the ambient air bypasses the dry heat transfer cell, and such that the ambient air passing through the dry heat transfer cell, when mixed with the ambient air bypassing the dry heat transfer cell, increases the temperature of the mixed ambient air to provide heated mixed ambient air, such that the cooling liquid in contact with the heated mixed ambient air is not likely to freeze, and the heated mixed ambient air then flows through the evaporative heat transfer cell with the distributor assembly of cooling liquid turned on.

Another aspect of the present invention relates to a second embodiment of hybrid heat exchange apparatus for indirectly transferring heat between a process fluid and ambient air, the apparatus comprising an evaporative heat transfer cell operative in a wet or dry mode and comprising an indirect evaporative heat transfer cell with a first process fluid coil assembly and a direct contact evaporative heat exchanger for direct contact of air and any cooling liquid which may selectively flow therethrough; an indirect dry heat transfer cell; and a fan for causing air to flow from the ambient atmosphere through the apparatus; the apparatus being manually or automatically controllable for turning on or off a distributor assembly of cooling liquid in the evaporative heat transfer cell, and for controlling air flow through a first air passage to bypass the dry heat transfer cell to flow through the direct contact evaporative heat exchanger in the evaporative heat transfer cell, or through a second air passage through the dry heat transfer cell and then through the direct contact evaporative heat exchanger in the evaporative heat transfer cell, or to partially bypass the dry heat transfer cell through the first air passage and partially flow through the second air passage, any air flowing through the first or second air passage then flowing through the direct contact evaporative heat exchanger in the evaporative heat transfer cell; wherein ambient air also flows through a third air passage directly from the ambient atmosphere through the first process fluid coil assembly in the evaporative heat transfer cell.

In this second embodiment, the evaporative heat transfer cell comprises the indirect evaporative heat transfer cell with the first process fluid coil assembly through which the process fluid flows internally within the first process fluid coil assembly and including a first process fluid inlet header and a first process fluid outlet header; the direct contact evaporative heat exchanger; the distributor assembly for selectively distributing cooling liquid from a source externally over the first process fluid coil assembly and the direct contact heat exchanger; and the fan for moving air externally through the first process fluid coil assembly and the apparatus.

Also in this second embodiment, the dry heat transfer cell comprises a second process fluid coil assembly through which the process fluid flows internally within the second process fluid coil assembly and air may selectively flow externally through the second process fluid coil assembly, the second process fluid coil assembly including a second process fluid inlet header and a second process fluid outlet header.

The second embodiment apparatus is operable in first, second, third and fourth modes, depending on the temperature of the ambient air and the ambient humidity, wherein in any of the modes, some air flows from the ambient atmosphere via the third air passage through the first process fluid coil assembly, as follows:

In the in the first mode, when the temperature of the ambient air is sufficiently warm that there is little likelihood that the cooling liquid will freeze and ambient conditions of temperature and humidity are such that evaporative heat transfer will be effective, selectably openable and closeable air inlet dampers are open, such that the ambient air bypasses the dry heat transfer cell and flows via the first air passage through the direct contact evaporative heat exchanger in the evaporative heat transfer cell with the distributor assembly of cooling liquid turned on.

In the second mode, when the temperature of the ambient air is likely to freeze the cooling liquid, the air inlet dampers are closed, such that the ambient air flows via the second air passage through the dry heat transfer cell and then through the direct contact evaporative heat exchanger in the evaporative heat transfer cell with the distributor assembly of cooling liquid turned off.

In the third mode, when the temperature of the ambient air is warmer than in the second mode, and ambient conditions of temperature and humidity are such that evaporative heat transfer and dry heat transfer will be effective, the air inlet dampers are closed, such that the ambient air flows via the second air passage through the dry heat transfer cell, increasing the temperature of the ambient air to provide heated air such that the cooling liquid in contact with the heated air is not likely to freeze, and then through the direct contact evaporative heat exchanger in the evaporative heat transfer cell with the distributor assembly of cooling liquid turned on.

In the fourth mode, when the temperature of the ambient air is warmer than in the third mode, and ambient conditions of temperature and humidity are such that evaporative heat transfer and dry heat transfer will be effective, the air inlet dampers are partially open, such that some of the ambient air flows via the second air passage through the dry heat transfer cell where it is heated and then flows through the direct heat transfer media in the evaporative heat transfer cell with the distributor assembly of cooling liquid turned on, and some of the ambient air bypasses the dry heat transfer cell and then flows via the first air passage through the direct contact evaporative heat exchanger in the evaporative heat transfer cell with the distributor assembly of cooling liquid turned on, whereby the heated ambient air passing through the dry heat transfer cell, when mixed with the ambient air bypassing the dry heat transfer cell, increases the temperature of the mixed ambient air to help keep the cooling liquid in contact with the heated air from freezing and aids in evaporative cooling of the cooling liquid in the direct contact evaporative heat exchanger.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 4 is a vertical cross-section view taken along lines A-A of the embodiment of FIG. 1, but without the optional direct contact evaporative heat exchanger, showing operation of the apparatus in a third, wet mode involving air flow through the dry heat transfer cells and the evaporative heat transfer cells with the distributor assembly of cooling liquid turned on.

FIG. 16 is an enlarged view of a portion of the serpentine tube of FIG. 15, showing the area in FIG. 15 within the circle designated "FIG. 16."

FIG. 17 is a vertical cross-section view taken along lines 17-17 of the serpentine tube embodiment of FIG. 16.

FIG. 18 is an end elevation view taken along the left-hand end of FIG. 15, showing a serpentine tube having a generally vertical plane extending 90° into the plane of the drawing sheet.

DETAILED DESCRIPTION OF THE PREFERRED EMBODIMENTS

Figure 5:
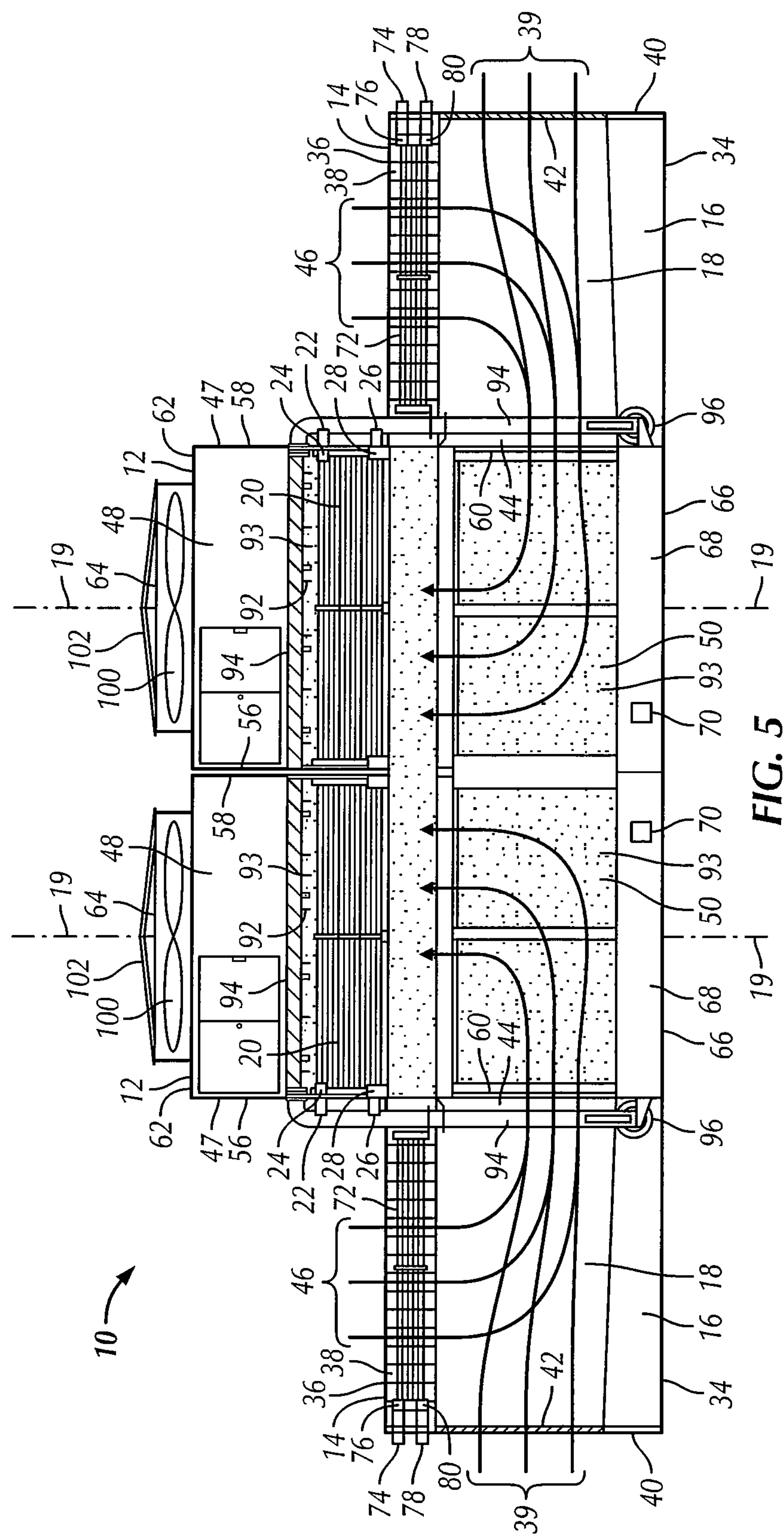
FIG. 5 is a vertical cross-section view taken along lines A-A of the embodiment of FIG. 1, but without the optional direct contact evaporative heat exchanger, showing operation of the apparatus in a first alternative of a fourth, wet mode involving the dry heat transfer cells and the evaporative heat transfer cells, with the air flow partially through and partially bypassing the dry heat transfer cells.
Figure 6:
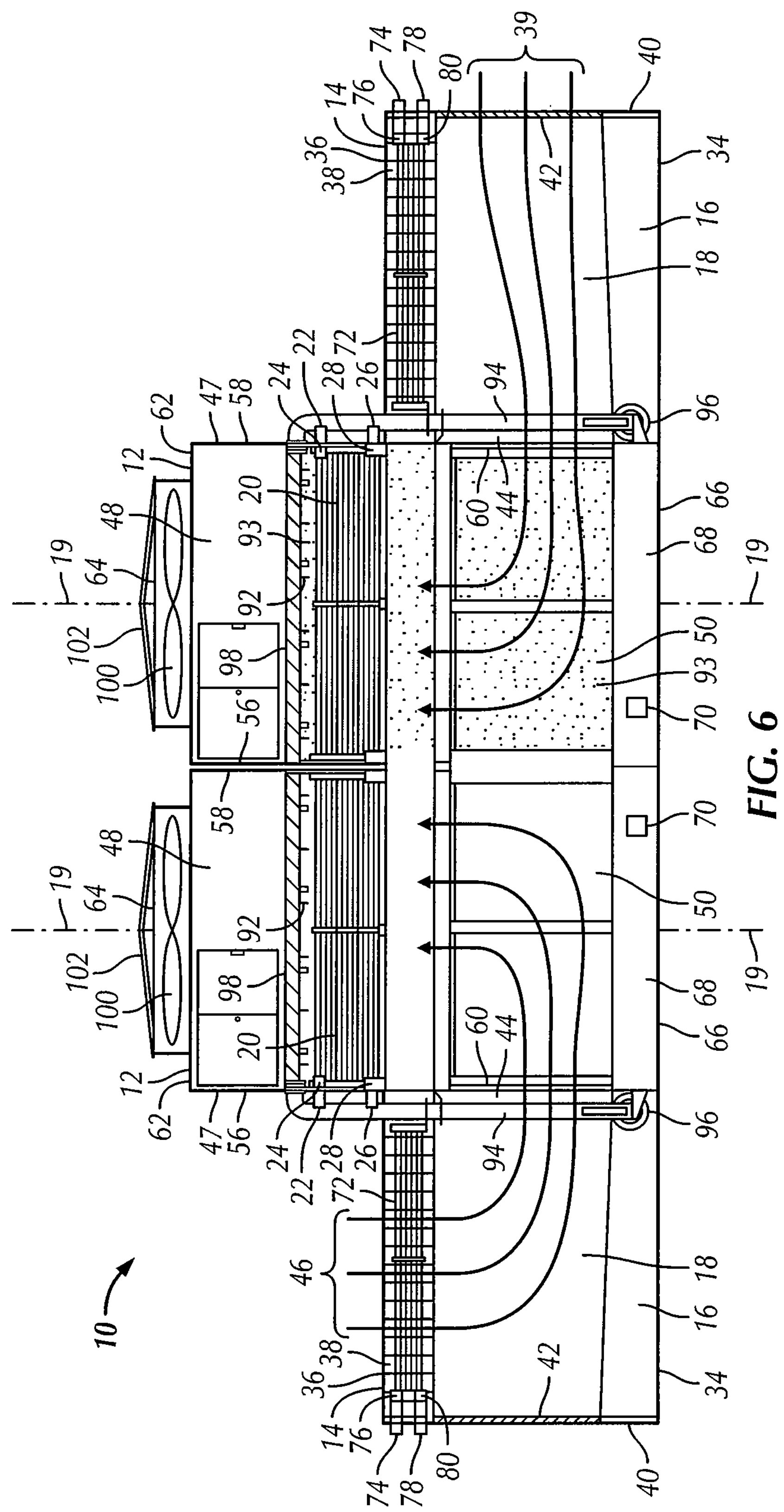
FIG. 6 is a vertical cross-section view taken along lines A-A of the embodiment of FIG. 1, but without the optional direct contact evaporative heat exchanger, showing operation of the apparatus in a second alternative of a fourth, partially wet mode involving the dry heat transfer cells and the evaporative heat transfer cells, with the air flow through some of the dry heat transfer cells and bypassing other of the dry heat transfer cells, with the distributor assembly of cooling liquid turned off for the air passage through the dry heat transfer cells but with the distributor assembly of cooling liquid turned on for the air passage bypassing the dry heat transfer cells.
Figure 7:
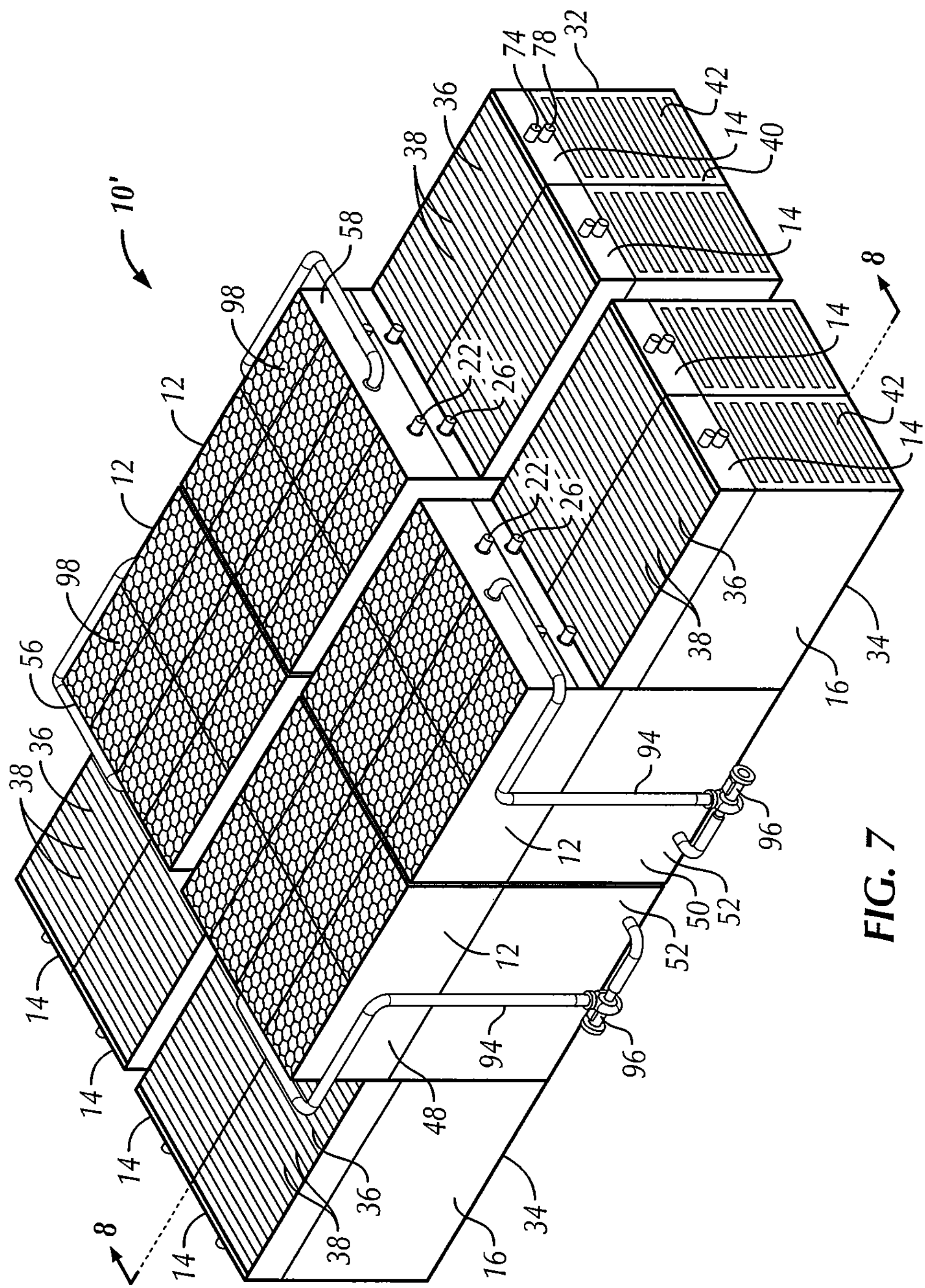
FIG. 7 is an isometric view of another embodiment of the hybrid heat exchange apparatus of the present invention, including four evaporative heat transfer cells and four dry heat transfer cells, without any optional direct contact evaporative heat exchanger, where fans partially induce the flow of air into the apparatus and force the flow of air through the first process fluid coil assembly in the evaporative heat transfer cells.
Figure 8:
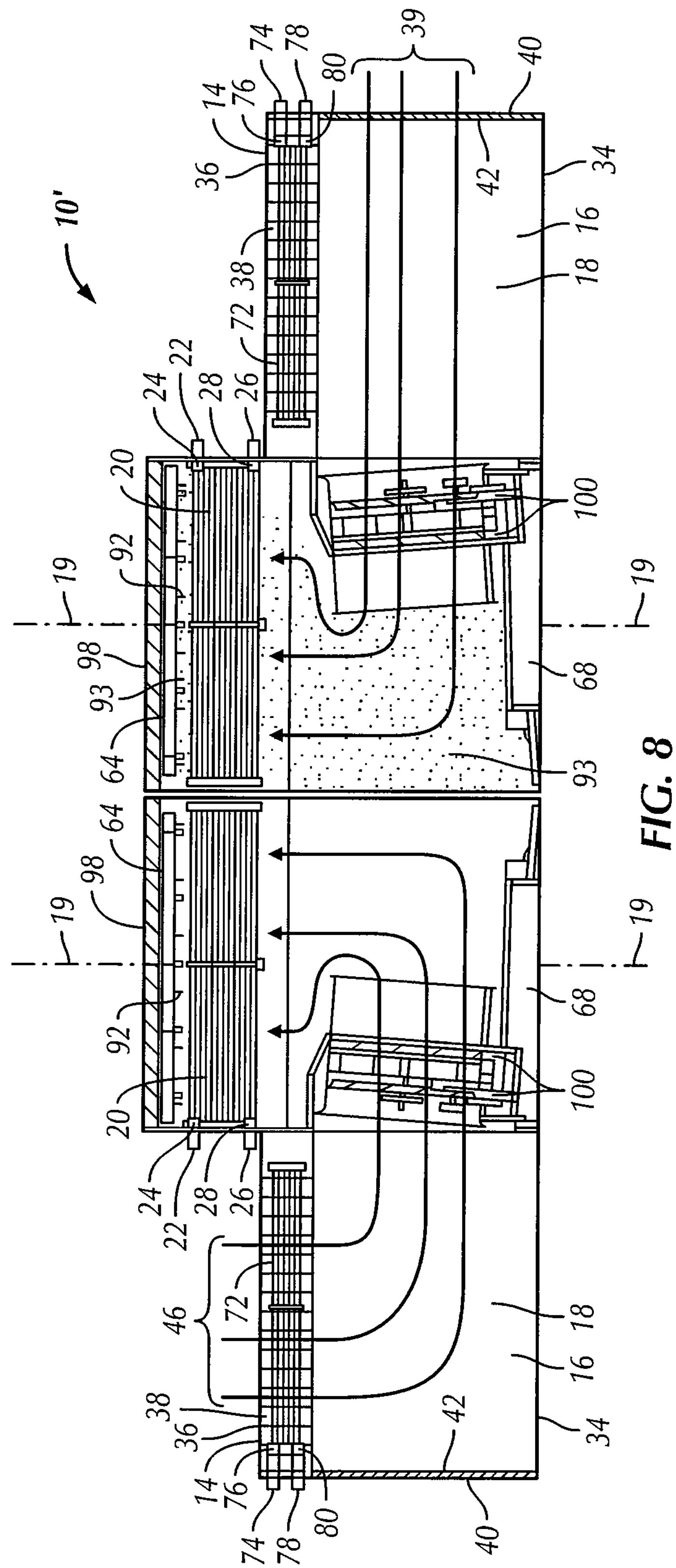
FIG. 8 is a vertical cross-section view taken along lines 8-8 of the embodiment of FIG. 7, showing a composite, schematic operation of the apparatus in an exemplary second alternative of a fourth, partially wet mode involving the dry heat transfer cells and the evaporative heat transfer cells, with the air flow through some of the dry heat transfer cells and bypassing other of the dry heat transfer cells, with the distributor assembly of cooling liquid turned off for the air passage through the dry heat transfer cells but with the distributor assembly of cooling liquid turned on for the air passage bypassing the dry heat transfer cells, this mode being shown only as one example of the various modes of operation of this second embodiment.
Figure 9:
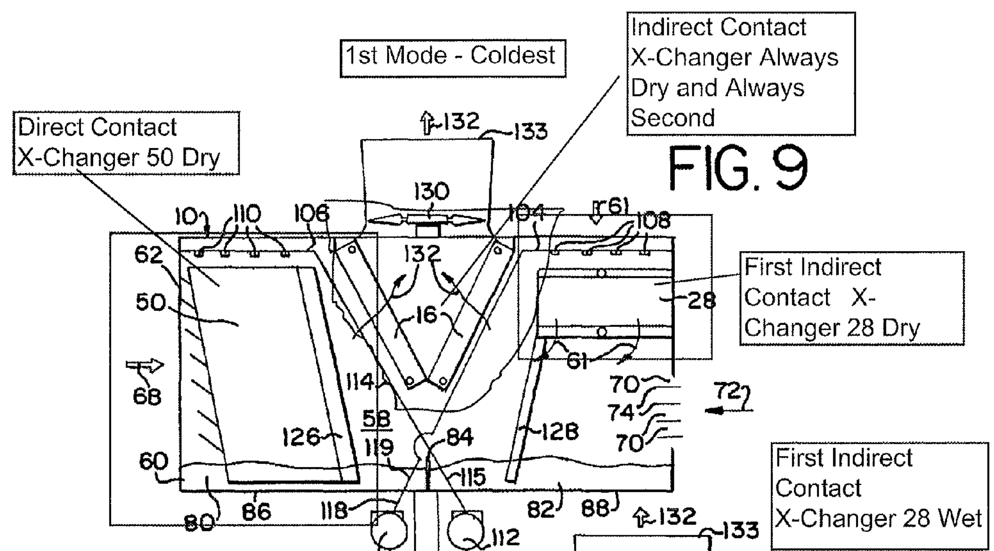
FIG. 9 is an isometric view of yet another, third embodiment of the hybrid heat exchange apparatus of the present invention, including four evaporative heat transfer cells and four dry heat transfer cells, where the ambient air flows via the first or second passages though a direct contact evaporative heat exchanger and ambient air also flows via a third air passage from the ambient atmosphere externally through the first process fluid coil assembly of the indirect evaporative heat transfer cells.
Figure 10:
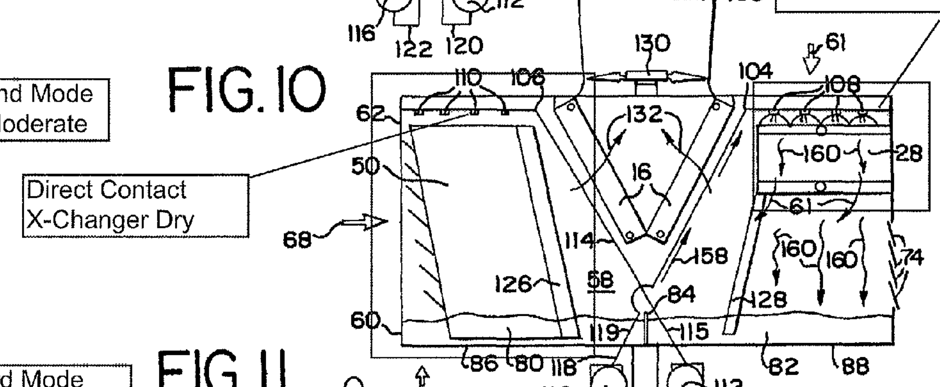
FIG. 10 is a vertical cross-section view taken along lines 10-10 of the embodiment of FIG. 9, showing a composite, schematic operation of the apparatus in an exemplary second alternative of a fourth, partially wet mode involving the dry heat transfer cells and the evaporative heat transfer cells, with some of the air flow through some of the dry heat transfer cells and bypassing other of the dry heat transfer cells, and some of the air flowing externally through the first process fluid coil assembly of the indirect evaporative heat transfer cells, and with the distributor assembly of cooling liquid turned off for the air passage through the dry heat transfer cells but with the distributor assembly of cooling liquid turned on for the air passage bypassing the dry heat transfer cells, this mode being shown only as one example of the various modes of operation of this third embodiment.

The present invention will be described with respect to a particular overall embodiment of the apparatus, as well as particular embodiments of the components that are presently preferred, without limitation to other embodiments having other components, in accordance with the claims hereof. The embodiments of the invention will be described with reference to the drawings, wherein like elements are identified by like numerals throughout the several views, although not every element is identified by a numeral in all views for the sake of clarity. FIGS. 1-6 illustrate a first embodiment of the hybrid heat exchange apparatus 10 with certain optional components as described below. FIGS. 7 and 8 illustrate a second embodiment of the hybrid heat exchange apparatus 10'. FIGS. 9 and 10 illustrate a third embodiment of the hybrid heat exchange apparatus 10". The general operation of the embodiments of the apparatus 10, 10' and 10" and is similar, with the operation of the first and second embodiments being more similar to each other than the operation of the third embodiment, which includes a third air passage and wherein air from the first and second air passages flows through the direct contact evaporative heat exchanger, with or without cooling liquid distribution, but the air from the first and second air passages does not flow though the first process fluid coil assembly in the evaporative heat transfer cell. Details of preferred coil assemblies and finned tubes thereof for the evaporative heat transfer cells used in the apparatus are shown and described with respect to FIGS. 11-19.

Figure 1:
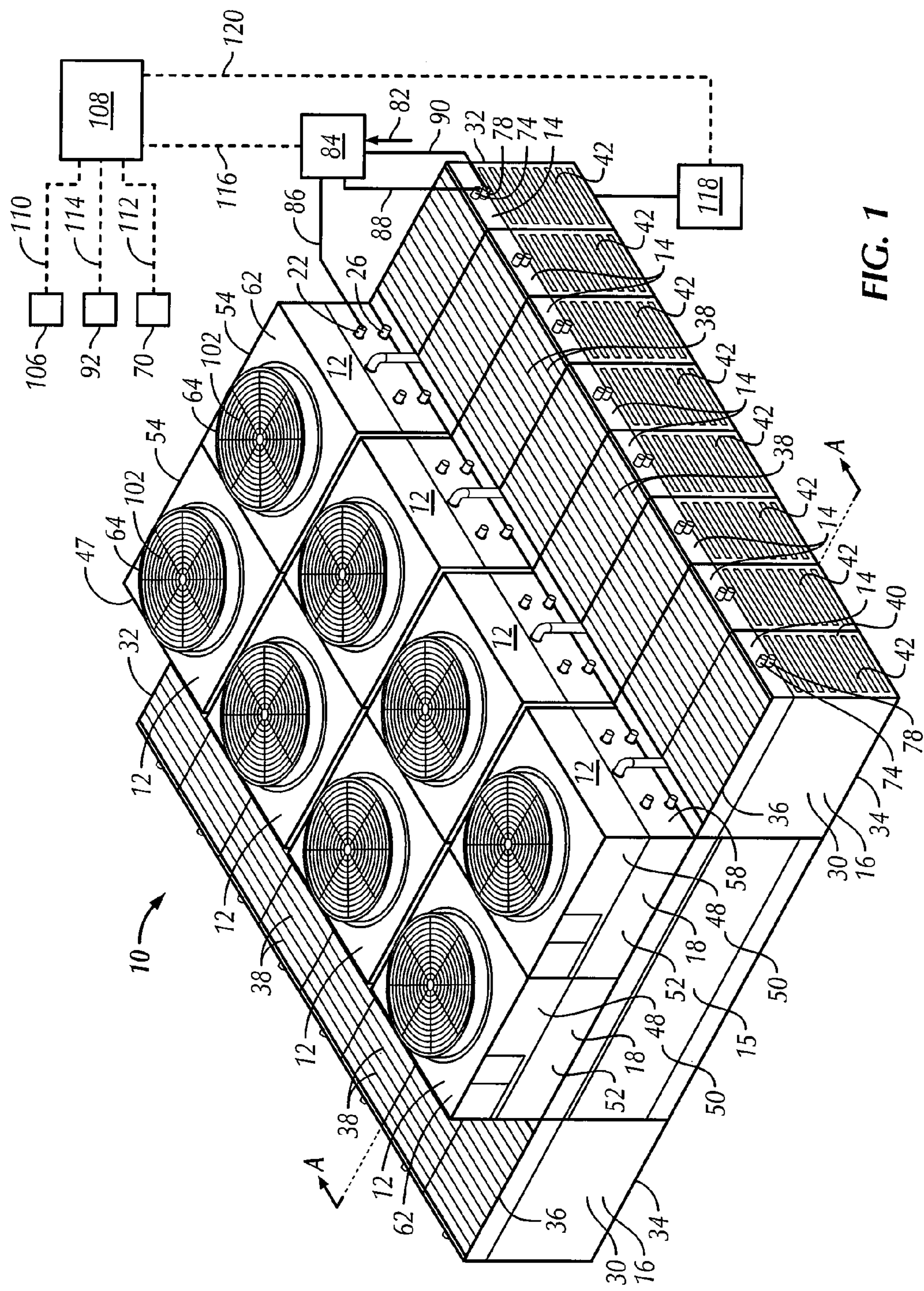
FIG. 1 is an isometric view of one embodiment of the hybrid heat exchange apparatus of the present invention, including eight evaporative heat transfer cells and eight dry heat transfer cells, as well as a schematic representation of control circuitry.
Figure 2:
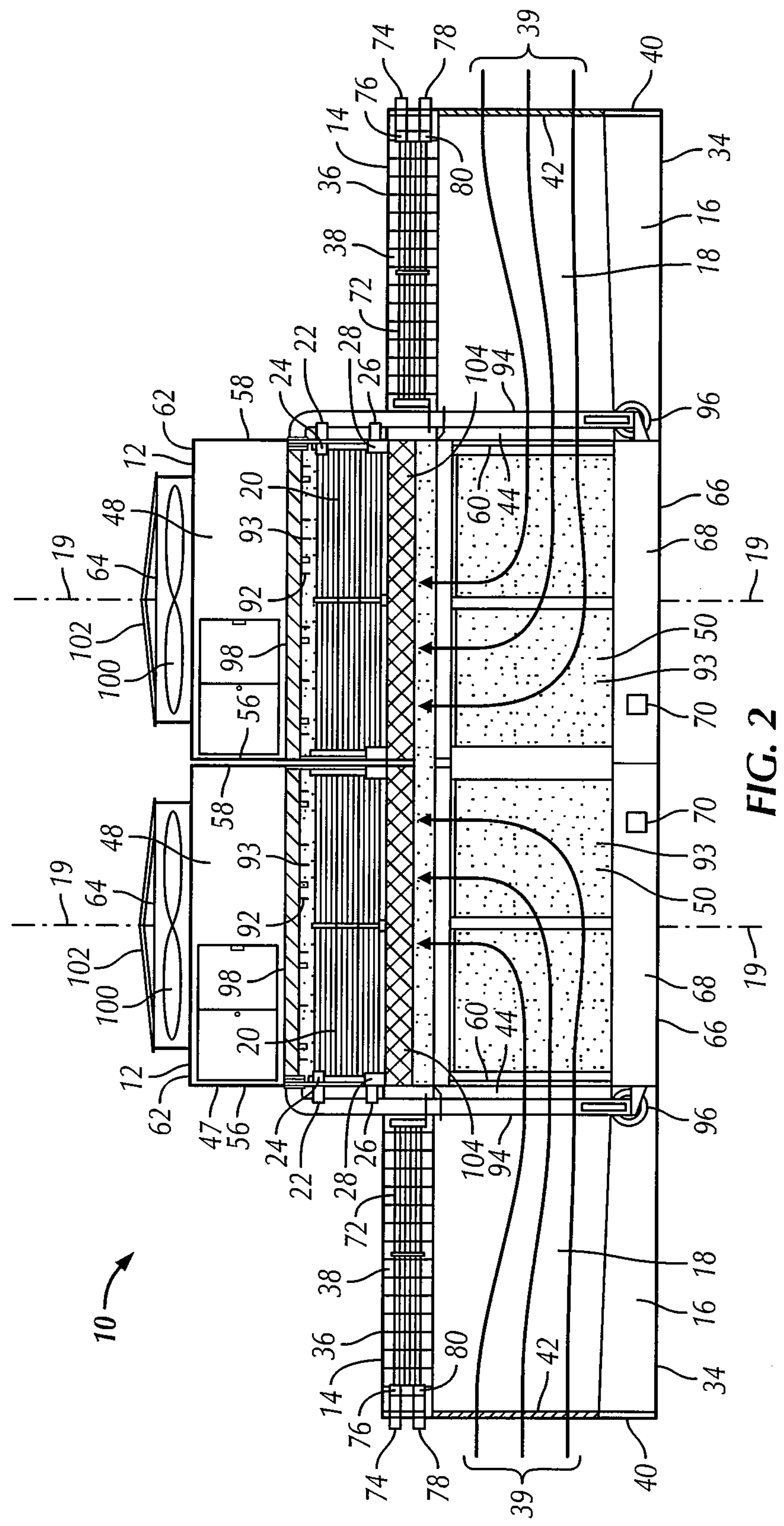
FIG. 2 is a vertical cross-section view taken along lines A-A of an embodiment of FIG. 1, showing operation of an embodiment of the apparatus in a first, wet mode in which ambient air bypasses the dry heat transfer cells and transfers heat in the evaporative heat transfer cells with the distributor assembly of cooling liquid turned on and where the evaporative heat transfer cells includes an optional direct contact evaporative heat exchanger below the first process fluid coil assembly.

With reference to the drawings relating to the first embodiment, and particularly FIGS. 1 and 2, the first embodiment of the invention is a hybrid heat exchange apparatus 10 for indirectly transferring heat between a process fluid and ambient air. As shown in the illustrated embodiment, the hybrid heat exchanger 10 comprises at least one evaporative heat transfer cell 12, comprising an indirect evaporative heat transfer cell, operative in a wet mode or a dry mode as described below and at least one dry heat transfer cell 14. As shown in FIG. 1, the apparatus 10 may include a plurality of evaporative heat transfer cells 12 and a plurality of dry heat transfer cells 14, where the operation of the individual cells are integrated as a complete hybrid heat exchange apparatus 10.

The apparatus 10 also includes a fan 100 for causing air to flow through the apparatus, and as shown schematically in FIG. 1, an optional system controller 108 for controlling flow of the process fluid, the operation of the evaporative heat transfer cell 12 and an ambient air flow control device in the form of a plenum chamber air flow inlet controller 118 to open, close or partially open or close selectively openable and closeable dampers 42 for directing the air to flow through a first air passage 39 (FIG. 2) and bypass the dry heat transfer cell 14, or to flow through a second air passage 46 (FIG. 3) through the dry heat transfer cell 14 and then through the evaporative heat transfer cell 12. Whether the air flow is via the first air passage 39 or via the second air passage 46, or both passages, the air flow then flows through the evaporative heat transfer cell 12, which may be operated in a dry mode or in a wet mode, depending on ambient atmospheric conditions, such as temperature, humidity and pressure. The air may also partially flow through and partially bypass the dry heat transfer cells 14 and then through the evaporative heat transfer cells 12 as shown in FIGS. 5 and 6. The second embodiment 10' of FIGS. 7 and 8 operates as described above with respect to the first embodiment 10.

Figure 3:
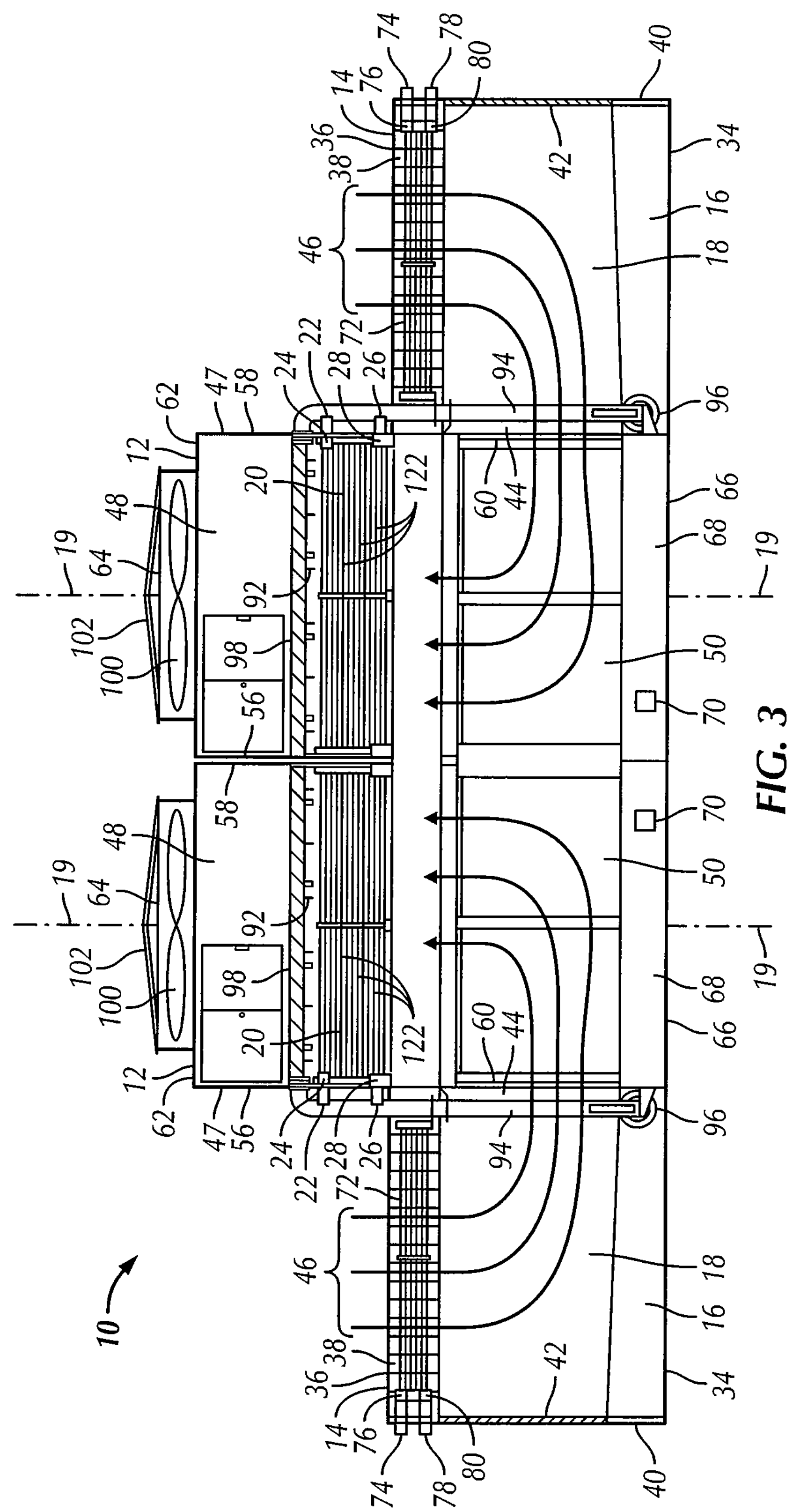
FIG. 3 is a vertical cross-section view taken along lines A-A of the embodiment of FIG. 1, but without the optional direct contact evaporative heat exchanger, showing operation of the apparatus in a second, dry mode involving the dry heat transfer cells and with the distributor assembly of cooling liquid turned off.

Before describing in more detail the components and operation of the hybrid heat exchange apparatus 10, the general operation of the apparatus of the first and second embodiments 10 and 10' will be described, with further explanation and details regarding various alternative embodiments and modes of operation set forth below. At normal ambient atmospheric conditions where freezing of the cooling liquid, typically water, is not of concern, air is drawn into the apparatus via the first air passage 39 through the open air intake dampers 42 as shown in FIG. 2, where the air bypasses the dry heat transfer cell 14 and enters the evaporative heat transfer cell 12 comprising the indirect evaporative heat transfer cell where heat transfer takes place involving the distribution 93 of cooling liquid driven by a pump 96. When the ambient temperature and the temperature of the cooling liquid fall to indicate a concern of freezing the cooling liquid, the air intake dampers 42 are closed to allow air to flow along a second air passage 46 through the dry heat transfer cell 14 as shown in FIG. 3, and then through the evaporative heat transfer cell 12, where the distributor assembly of cooling liquid is turned off. In these freezing conditions, the ambient air dry bulb temperature and wet bulb temperature increase, eliminating the potential of the recirculating cooling water in the evaporative heat transfer cell 12 to freeze. Passing the air through the dry heat transfer cell 14 provides heat rejection from the process fluid to heat the air and allows the evaporative heat transfer cell 12 comprising the indirect evaporative heat transfer cell to operate at lower actual ambient conditions than if the dry heat transfer cell 14 were not used.

All embodiments of the hybrid heat exchange apparatus may be controlled manually by having a person directly control the various switches for the pumps, fans and, where applicable when the apparatus is operating as a cooler, rather than as a condenser, the flow of the process fluid. The hybrid heat exchange apparatus 10 may, and preferably does include automatic system control having a system controller 108, schematically shown in FIG. 1 for turning on or off the distributor assembly of cooling liquid in the evaporative heat transfer cell and for controlling air flow, preferably using an optional ambient air flow control device 118 for directing the air to bypass the dry heat transfer cell 12 to flow through the first air passage 39 or to flow through the second air passage 46 through the dry heat transfer cell 14 and then through the evaporative heat transfer cell 14. When operating as a cooler, the apparatus 10 may be controlled manually or automatically to control the flow of the process fluid in parallel or in series internally in the first and/or second process fluid coil assemblies. The air flow from the first or second air passages then flows through the evaporative heat transfer cell 12. The system controller 108 also allows the air to partially flow through and partially bypass the dry heat transfer cell 14 and then through the evaporative heat transfer cell 12.

The first processing fluid coil assembly 20 used in the indirect evaporative heat transfer cell of the evaporative heat transfer cell 12 may be of various configurations, so long as it has the basic structure and operation described below. One preferred type of first processing fluid coil assembly 20 used in the evaporative heat transfer cell 12 is any of several available from Evapco, Inc., the assignee of the present invention, such as Models ATC or ATWB, which may include the components and operate as disclosed in Evapco, Inc.'s U.S. Pat. No. 4,755,331, the entirety of the disclosure of which is hereby incorporated by reference herein.

Operatively, with reference to FIG. 2, the indirect evaporative heat transfer cell of the evaporative heat transfer cell 12 includes a first process fluid coil assembly 20 through which internally flows any process fluid, such as those mentioned above, that is relevant to the use of the apparatus of the present invention. The process fluid flow to and through the coil assembly is controlled by the system controller 108 discussed below. Embodiments of preferred coil assemblies for coil assembly 20 may include Evapco, Inc.'s Thermal-Pak® and Thermal-Pak® II coil assemblies disclosed in the patent mentioned in the previous paragraph, or Evapco, Inc.'s Sensi-Coil® coil assembly disclosed in U.S. Pat. No. 7,296,620, the entirety of the disclosure of which is hereby incorporated by reference herein, though other coil assemblies could be used if desired, and particularly those illustrated in FIGS. 11-19 and described below, preferably using finned tubes that have not been previously used in evaporative heat transfer cells.

At least one coil assembly 20, which may be operative as a dry heat transfer cell or an evaporative heat transfer cell, comprised of a plurality of tubes 122, which may or may not be finned tubes as described below with respect to FIGS. 15-18, through which a process fluid flows internally from an inlet 22 to an outlet 24, is mounted in the housing 15, such that the major plane 26 of each coil assembly is generally normal to the longitudinal axis 19 of the plenum chamber 18. At least one heat exchange cell 28, which may be operative as a dry heat transfer cell or an evaporative heat transfer cell, is mounted within the plenum chamber 18.

In general, a first process fluid coil assembly 20 has a generally parallelepiped overall shape of six sides retained in a frame 21 and has a major plane 23, where each side is in the form of a rectangle. The coil assembly 20 may be made of multiple horizontal closely spaced parallel, serpentine tubes 122 connected at their ends to form a number of circuits through which the process fluid flows. Each individual circuit within the coil assembly may be a single, continuous length of coil tubing that is subjected to a bending operation which forms the tubing into several U-shaped rows that are in a generally vertical and equally-spaced relationship from each other, such that each circuit has a resultant serpentine shape. Other embodiments of coil assemblies that may be used as the first process fluid coil assembly 20 will be described in more detail below, after the following further description of the apparatus 10.

The first process fluid coil assembly 20 has an inlet 22 connected to an inlet manifold or header 24, which fluidly connects to inlet ends of the serpentine tubes of the coil assembly, and an outlet 26 connected to an outlet manifold or header 28, which fluidly connects to the outlet ends of the serpentine tubes of the coil assembly. Although the inlet 22 is shown at the top and the outlet 26 is shown at the bottom of the coil assembly 20, the orientation of the inlet and outlet could be reversed, such that the inlet is at the bottom and the outlet is at the top, if desired. The first process fluid coil assembly 20 preferably has maximum dry and wet performance and a low fluid pressure drop, as does Evapco, Inc.'s Thermal-Pak®, Thermal-Pak® II and Sensi-Coil® coil assemblies. Details of other aspects and different embodiments of the evaporative heat transfer cells 12 and their first process fluid coil assemblies 20 will be described below.

The dry heat transfer cell 14 also may be of various configurations, so long as it has the basic structure and operation described below. Preferred types of dry heat transfer cells 14 may be any of several available from Evapco, Inc., which may include the components and operate as disclosed in Evapco, Inc.'s U.S. Pat. No. 5,425,414 or U.S. Pat. No. 5,799,725, the entirety of the disclosures of which are hereby incorporated by reference herein.

Also with reference to FIG. 2, the dry heat transfer cell 14 operatively includes a second process fluid coil assembly 72, through which the process fluid internally flows under control of the system controller 108. Preferably, the second process fluid coil assembly 72 is a finned tube coil assembly, where fins on individual substantially straight tubes or serpentine circuits of tubes may have fins on their exterior surfaces to enhance heat transfer, or the tubes may extend through sheets forming fins for the entire coil assembly. Particularly efficient finned coil assemblies 72 that are preferred for use in the dry heat transfer cells 14 of the present invention are those disclosed in the Evapco, Inc. patents of the preceding paragraph. Preferably, but without limitation, the second process fluid coil assembly 72 comprises a copper coil with aluminum fins or stainless steel with aluminum fins, where the fins maximize the surface area available for heat transfer. No external evaporative cooling takes place in the dry heat transfer cell 14.

The second process fluid coil assembly 72 has an inlet 74 connected to an inlet manifold or header 76, which fluidly connects to inlet ends of the tubes of the coil assembly, and an outlet 78 connected to an outlet manifold or header 80, which fluidly connects to the outlet ends of the tubes of the coil assembly. Although the inlet 74 is shown at the top and the outlet 78 is shown at the bottom of the coil assembly 72, the orientation of the inlet and outlet could be reversed, such that the inlet is at the bottom and the outlet is at the top, if desired. In the totally dry second mode of operation of the hybrid heat exchange apparatus 10, no water is consumed and no plume of mist of cooling water or other cooling liquid is created.

With reference primarily to FIGS. 1 and 2, the hybrid heat exchange apparatus 10 includes at least one evaporative heat transfer cell 12 comprising the indirect evaporative heat transfer cell and at least one dry heat transfer cell 14, as explained above. They are preferably housed in a single housing 15, though the cells can be present as separate cells so long as the air passages and process fluid conduits are connected. The single housing 15 may be made of the component evaporative heat transfer cells 12 and dry heat transfer cells 14 connected together for maximum use of space and efficient air passages and process fluid passages. One embodiment of the apparatus 10 having a housing 15 also includes a plenum chamber housing 16 (best seen in FIG. 1), in which a plenum chamber 18 is located (as seen in FIG. 2). The plenum chamber 18 has a generally, and preferably substantially vertical longitudinal axis 19 that will be referred to below primarily with respect to the orientation and configuration of certain embodiments of components of the apparatus 10. The housing 15, as well as the housings 16 for the plenum chambers 18 and the housings 47 for the evaporative heat transfer cells 12 used in the hybrid heat exchange apparatus 10 may be made of any suitable, durable material, such as galvanized steel or stainless steel, among other materials typically used for these products.

The other embodiments of the hybrid heat exchange apparatus 10' shown in FIGS. 7 and 8 and 10" shown in FIGS. 9 and 10, each may also have a single or a plurality of evaporative heat transfer cells 12 and a single or a plurality of dry heat transfer cells 14, that may be and preferably are housed in a combined housing, though all embodiments of the hybrid heat exchange apparatus of the present invention could be configured as separate cells connected by conduits for the air passages in fluid communication, if desired.

The hybrid heat exchange apparatus 10 will now be described with respect to an embodiment including one evaporative heat transfer cell 12 and one dry heat transfer cell 14, rather than the plurality of each shown in FIG. 1, but still with reference to FIGS. 1 and 2, where the cross-section view of FIG. 2 shows two evaporative heat transfer cells 12 adjacent to and in fluid communication with each other and with a dry heat transfer cell 14 on the opposite side of each evaporative heat transfer cell 12. The plenum chamber housing 16 includes a front wall 30, a back wall 32, a bottom wall 34, a top wall 36 with openings 38 to allow air to flow through the second air passage 46, and an outside side wall 40. Although the top openings 38 may be controlled by dampers that may be opened or closed, more typically, the openings are in the form of an open top, since the structure of the second process fluid coil assembly 72 results in a sufficient pressure drop from the air inlet side to the air outlet side, such that air entering the apparatus from open air inlet dampers 42 would cause substantially no air to flow through the top openings 38, since air flows through the path of least resistance. Selectively openable and closeable ambient air inlet dampers 42 are formed in the side wall 40. If desired, for a purely manual operation and to reduce equipment cost, the air inlet dampers could be in the form of louvers that are always open, and when it is desired to block the air flow through them completely or partially, a physical barrier, such as a metal, polymeric or other solid material impervious to air, could be placed in front of the openings to block the openings to the desired extent. The term “selectively openable and closeable ambient air inlet dampers” and variations thereof as used herein include such open, blockable louvers. Opposite the side wall 40, the plenum chamber 18 has an open side 44 as shown in FIG. 2 that is in fluid communication with the interior of the plenum chamber of the evaporative heat transfer cell 12, as explained below. The second process fluid coil assembly 72 is mounted in the top of the plenum chamber 18 of the dry heat transfer cell 14 such that the second air passage 46 passes from the ambient atmosphere through the openings 38 in the top wall 36 then externally through the second process fluid coil assembly 72 and into the plenum chamber 18. Other configurations of the location of the second process fluid coil assembly 72 within the plenum chamber housing 16 are readily available as desired, so long as the air passages are maintained either through or bypassing the second fluid coil assembly, and so long as the dry heat transfer cell or cells 14 are upstream of the evaporative heat transfer cell or cells 12 in the air flow through the apparatus 10, 10' and 10".

The evaporative heat transfer cell 12 has a housing 47, including an upper portion 48 and a lower portion 50. The housing 47 also has a front wall 52, a back wall 54, a left side wall 56, a right side wall 58 with an opening 60 in the lower portion 50, as well as a top wall 62. The top wall 62 includes an air outlet 64, which may be in a raised area surrounding an induced draft fan 100.

The first process fluid coil assembly 20 is mounted in the upper portion 48 of the evaporative heat transfer cell 12. A bottom wall 66 of the evaporative heat transfer cell 12, together with the adjoining front, back and side walls defines a sump 68 for the cooling liquid (hereinafter, the cooling liquid may be referred to as water, for the sake of clarity, since it is by far the most typical, but not the exclusive type of cooling liquid). If desired, a drain pipe with an appropriate valve and a fill pipe with an appropriate valve (none of which is shown) may be included for draining and filling or replenishing the sump 68. A temperature sensor 70 (two of which are shown in FIG. 2) senses the temperature of the water in the sump 68. The apparatus is operated such that the water in the sump is kept at a temperature of at least about 33° F. (1.1° C.), and preferably at least about 36° F. (2.2° C.), such that it does not freeze. Water in the sump 68 is circulated to a selectively operable cooling liquid distributor assembly 92, which when turned on, creates a distribution 93 of water as the evaporative cooling liquid above the first process fluid coil assembly 20 (and also above any direct contact evaporative heat exchanger, such as wet deck fill direct contact heat transfer media 104, if such optional media is present and if it is located above the first process fluid coil assembly 20, as described below). The distributor assembly 92 distributes water over the first process fluid coil assembly 20 and any optional fill media 104 that is present in the upper portion 48 of the evaporative heat transfer cell 12. The distributor assembly 92 is connected to one end of a conduit 94 in fluid connection at the other end to the water in the sump. The distributor assembly 92 is activated or turned on typically when a pump 96 is turned on to pump water from the sump 68 to the distributor assembly 92 through the conduit 94.

If desired, direct contact evaporative heat exchanger, such as direct contact heat transfer media 104, shown only in FIG. 2 of the first embodiment of the hybrid heat exchange apparatus 10, optionally may be used and may be located above or below the first process fluid coil assembly 20, but is shown in FIG. 2 below the first process fluid coil assembly 20 for the sake of convenience. In general, as shown in FIGS. 3-6, the first embodiment of the apparatus 10 does not include the optional use of the direct contact heat transfer media 104 or any other direct contact evaporative heat exchanger.

When present, the direct contact evaporative heat exchanger, typically in the form of direct contact heat transfer media 104, which is known as wet deck fill, provides direct, evaporative heat exchange when the air flow and the evaporative water or other cooling liquid come into direct contact with each other and are mixed with some desired degree of turbulence within the wet deck fill heat transfer media 104, when used. The turbulent mixing of the air and water in the heat transfer media 104 allows for greater heat transfer between the air and water, but the benefits of the increased turbulent mixing in the media 104 should not be overcome by potential adverse effects on the energy requirements of a larger fan motor or fan size or air flow reduction. As is well known in the art, there is a fine balance among these factors when deciding whether and what type of wet deck fill heat transfer media to use. That is why the use of the media 104 is optional in the first embodiment of apparatus 10. When used, the wet deck fill media 104 may be any standard fill media, such as plastic fill, typically PVC, as well as wood or ceramic fill media, or any other fill media known in the art. The presently preferred fill media is Evapco, Inc.'s EVAPAK® PVC fill, disclosed in Evapco, Inc.'s U.S. Pat. No. 5,124,087, the entire disclosure of which is hereby incorporated by reference herein. When heat transfer media 104 is used, it may be located below the first process fluid coil assembly 20 as shown in FIG. 2 for convenience, or above the first process fluid coil assembly 20, so that greater cooling of the air and the water take place above the first process fluid coil assembly 20.

Alternative, mandatory use of direct heat transfer media 104 is described below with regard to a different air flow pattern in the third alternate embodiment of the hybrid heat exchange apparatus 10".

The evaporative heat transfer cell 12 also includes drift eliminators 98 above the distributor assembly 92 and below the fan 100 and outlet 64. The drift eliminators very significantly reduce water droplets or mist entrained in the air exiting the outlet 64. Many drift eliminators of various materials are available commercially. The presently preferred drift eliminators are PVC drift eliminators available from Evapco, Inc. as disclosed in Evapco, Inc.'s U.S. Pat. No. 6,315,804, the entire disclosure of which is hereby incorporated by reference herein. A grating or screen 102 is placed over the fan 100 for safety and to keep debris away from the fan 100 and out of the evaporative heat transfer cell 12.

Preferably, the plenum chamber front wall 30 is coextensive with the evaporative heat transfer cell front wall 52. Preferably, the plenum chamber back wall 32 is coextensive with the evaporative heat transfer cell back wall 54. With this exemplary construction, as with any other suitable construction, there is fluid communication between the evaporative heat transfer cell 12 and the dry heat transfer cell 14. Where the hybrid heat exchange apparatus 10 includes only one evaporative heat transfer cell 12 and one dry heat transfer cell 14, the evaporative heat transfer cell side 56 opposite the opening 60 in the lower portion 50 of the side wall 58 is solid, such that the apparatus is substantially airtight from extraneous air flow other than air passing through air passages 39 and/or 46 and out through the outlet 64 as follows. As used herein, the term "substantially airtight" means that within reasonable manufacturing tolerances, and subject perhaps to certain leaks that may develop, the vast majority of the air flows into the apparatus through the various inlets and out of the outlets without major leakage that would adversely affect the operation of the apparatus. The opening 60 in the lower portion 50 of the side wall 58 of the evaporative heat transfer cell 12 communicates with the open side 44 of the plenum chamber 18 to create an air flow path from the plenum chamber 18 through a plenum chamber in the lower portion 50 of the evaporative heat transfer cell 12. The fan 100 is shown as a propeller fan and is preferred for use as an induced draft fan to draw air from the ambient atmosphere, through air passages 39 and/or 46 through the open side 44 of the plenum chamber 18, the opening 60 in the lower portion 50 of the evaporative heat transfer cell 12, through the first process fluid coil assembly 20 and any heat transfer media 104 that may be used, through the distributor assembly 92 which may or may not be turned on, through the drift eliminators 98 and out the outlet 64 to the ambient atmosphere.

Other types of fans, such as centrifugal fans, could be, but usually are not used as induced draft fans. While centrifugal fans or propeller fans could also be used in a forced draft mode, in the embodiment of apparatus 10 shown in FIGS. 1-6, that is not presently preferred due to the additional complications of economically creating appropriate air flow paths through the hybrid heat exchange apparatus 10.

FIGS. 7 and 8 show a second embodiment of the hybrid heat exchange apparatus 10' of the present invention, including four evaporative heat transfer cells 12 and four dry heat transfer cells 14, without any optional direct contact evaporative heat exchanger, where fans partially induce the flow of air into the apparatus and force the flow of air through the first process fluid coil assembly in the evaporative heat transfer cells. More specifically, as best seen in FIG. 8, an exemplary second alternative of a fourth, partially wet mode involving the dry heat transfer cells and the evaporative heat transfer cells, with the air flow through some of the dry heat transfer cells and bypassing other of the dry heat transfer cells, with the distributor assembly 92 of cooling liquid turned off for the air passage through the dry heat transfer cells 14 but with the distributor assembly 92 of cooling liquid turned on for the air passage bypassing the dry heat transfer cells 14, this mode being shown only as one example of the various modes of operation of this second embodiment of apparatus 10'. Thus, except for the use of the fans 100 as described above partially in a forced draft mode, the second embodiment of apparatus 10' operates in the same modes and manner as the first embodiment of the apparatus 10 shown in FIGS. 1-6 and described herein.

As mentioned above, all embodiments of the hybrid heat exchange apparatus of the present invention may operate as a condenser of the process fluid or as a cooler of the process fluid. Any given installation of the apparatus would be designed and configured for operation either as a condenser or as a cooler, but not both for the same installation.

When any of the embodiments of the hybrid heat exchange apparatus of the present invention operates as a condenser of the process fluid, the process fluid is supplied in the form of a condensable gas, such as ammonia, or FREON® refrigerant, for example. When the apparatus is operating as a condenser, the process fluid is separated by use of a "T" or "Y" in a process fluid conduit (not shown) from a process fluid source schematically depicted in FIG. 1 as source 82 such that it flows in parallel separately through the first process fluid coil assembly 20 of the evaporative heat transfer cell 12 and through the second process fluid coil assembly 72 of the dry heat transfer cell 14. The process fluid gas is cooled and condensed in the first and second process fluid coil assemblies 20 and 72, respectively. In this condensing operation, the process fluid is delivered to the inlet 22 of the first process fluid coil assembly 20 and to the inlet 74 of the second process fluid coil assembly 72 for distribution though the coil assemblies. Since the process fluid is a gas, a process fluid valve assembly 84, as shown schematically in FIG. 1, to direct the flow of process fluid from to either or both of the coil assemblies when the apparatus is used as a cooler for liquid process fluid, rather than as a condenser, is not needed, because the gas will naturally flow to the point of lowest pressure.

When any of the embodiments of the hybrid heat exchange apparatus of the present invention operates as a cooler of the process fluid, the process fluid is supplied in the form of a non-condensable gas or a liquid. When the apparatus is operating as a cooler and the process fluid is a non-condensable gas, as in the case of the operation as a condenser, the gaseous process fluid is separated by use of a "T" or "Y" in a process fluid conduit (not shown) from a process fluid source schematically depicted in FIG. 1 as the source 82 such that it flows in parallel separately through the first process fluid coil assembly 20 of the evaporative heat transfer cell 12 and through the second process fluid coil assembly 72 of the dry heat transfer cell 14. Similarly as with the condenser operation, the process fluid non-condensable gas is delivered to the inlet 22 of the first process fluid coil assembly 20 and to the inlet 74 of the second process fluid coil assembly 72 for distribution though the coil assemblies. Also like the condenser operation, since the process fluid is a gas, the process fluid valve assembly 84 is not needed, because the gas will naturally flow to the point of lowest pressure.

When the apparatus is operating as a cooler and the process fluid is a liquid, the process fluid may flow, as directed by the valve assembly 84, in parallel separately through the first process fluid coil assembly 20 of the evaporative heat transfer cell 12 and through the second process fluid coil assembly 72 of the dry heat transfer cell 14. In this operation, the valve assembly 84 directs the process fluid to the inlet 22 of the first process fluid coil assembly 20 via a conduit 88 and to the inlet 74 of the second process fluid coil assembly 72 via a conduit 88 for distribution though the coil assemblies.

When the apparatus is operating as a cooler and the process fluid is a non-condensable gas or a liquid, the process fluid preferably flows serially first through the second process fluid coil assembly 72 of the dry heat transfer cell 14 and then through the first process fluid coil assembly 20 of the evaporative heat transfer cell 12. In this operation, the flow is controlled by the valve assembly 84 and the process fluid is delivered via the conduit 88 to the inlet 74 for distribution through the second process fluid coil assembly 72 where the partially cooled process fluid is cooled and then exits the outlet 78 of the second process fluid coil assembly 72. From there, as shown in FIG. 1, the process fluid flows through a conduit 90, preferably, but not necessarily to the valve assembly 84, and then through the conduit 86 to the inlet 22 for distribution through the first process fluid coil assembly 20, where the process fluid is cooled further, even if the distributor assembly 92 of the cooling water is turned off, but with greater cooling in such environmental conditions when the distributor assembly 92 of cooling water is turned on.

For controlling the flow of liquid process fluid, valves 84 would be used to direct the flow of the liquid process fluid, driven by pumps (not shown) as necessary. It may also be possible and desirable in some situations to direct the process fluid in the cooling operation of the apparatus to one coil assembly or the other. The flow of the process fluid is controlled and the apparatus is operated to keep the water temperature in the sump 68 above freezing.

As mentioned above, the apparatus of the present invention can be controlled manually or automatically, where the optional control system will now be described with reference to the schematic diagram of FIG. 1.

In the case where all adjustments and operations of the apparatus could be controlled manually, they are based on observation of the temperature of the water in the sump based on the temperature sensors 70, and the ambient atmospheric conditions such as dry bulb temperature, wet bulb temperature, humidity and pressure as sensed by ambient conditions sensor 106. However, it is certainly more convenient, less labor intensive and more efficient to have the apparatus 10 subject to automatic operation and adjustments by using a system controller 108, which may be in the form of a programmable digital computer, with appropriate logic circuitry. All of the programming instructions would be well known to those skilled in the art, as heat exchange systems are routinely programmed to run automatically. Thus, any such programming would be able to be done readily, and as such, programming instructions are not and need not be disclosed herein.

Input into the system controller 108 comes from the ambient atmospheric conditions sensor 106 via a wired or wireless remote connection 110, and from the sump liquid temperature sensor 70 via a wired or wireless remote connection 112. Based on the readings from the sensors 106 and 70, the system controller 108 controls the distributor assembly 92 via a wired or wireless remote connection 114 to turn on or off the distribution of water, as explained below. Typically, the distributor assembly 92 is turned on by turning on the pump 96 for pumping the water from the sump 68 through the conduit 94 to the distributor assembly 92, but other ways of controlling the distributor assembly could be used, if desired. Likewise, the system controller 108 controls valve assembly 84, which may be solenoid or other remotely controlled valves well known to those skilled in the art, that controls the flow of the process fluid into and to and through the first process fluid coil assembly 20 and/or the second process fluid coil assembly 72 via a wired or wireless remote connection 116. Process fluid enters the apparatus 10 via a process fluid inlet 82 into the valve assembly 84. Potential routing by the valve assembly 84 of the process fluid includes routing to the inlet 22 of the first process fluid coil assembly 20 via a conduit 86, routing to the inlet 74 of the second process fluid coil assembly 72 via a conduit 88, and routing from the outlet 78 of the second process fluid coil assembly 72. Additionally, the system controller 108 controls the plenum chamber air flow inlet controller 118 for opening or closing the ambient air inlet dampers 42 via a wired or wireless remote connection 120. The plenum chamber air flow inlet controller 118 operates the dampers 42 by means of linear actuators, solenoids, servo motors or any other well known opening and closing devices.

Before describing the operation of the hybrid heat exchange apparatus of the present invention and other embodiments of the hybrid heat exchange apparatus 10, 10' and 10" in more detail, various other embodiments of the first process fluid coil assembly 20 that may be used in the indirect evaporative heat transfer cells of the evaporative heat transfer cells 12 will now be described. These other embodiments of the coil assemblies 20 may use tubes that may or may not have fins, but certain preferred embodiments use novel finned tubes of a type that have not been used in evaporative heat transfer cells.

Figure 11:
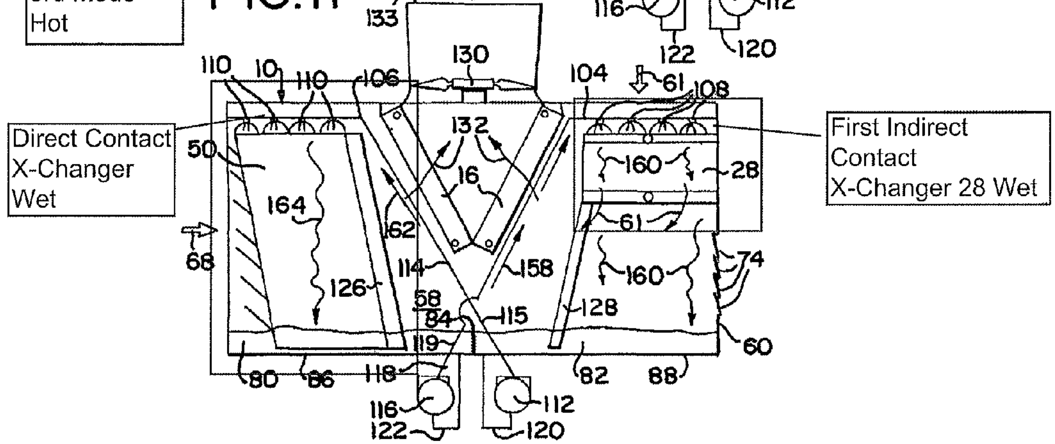
FIG. 11 is an isometric view of one embodiment of an exemplary first process fluid coil assembly for an evaporative heat transfer cell made using serpentine finned tubes.
Figure 12:
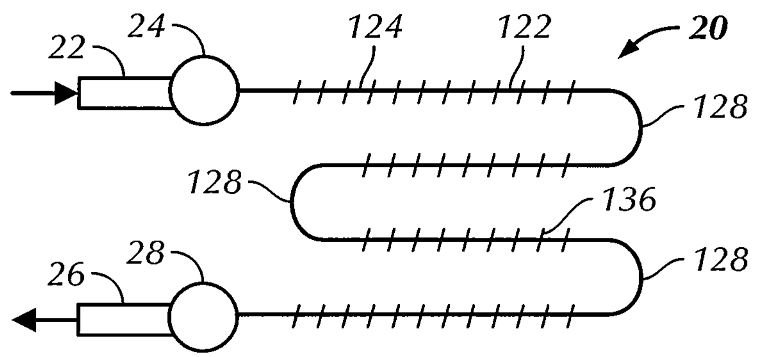
FIG. 12 is a schematic side elevation view of the embodiment of the exemplary first process fluid coil assembly of FIG. 11 made using serpentine finned tubes.

In general, a first process coil assembly 20 for use in the evaporative heat transfer cells 12 has a generally parallelepiped overall shape of six sides and retained in a frame 21 and has a major plane 23, where each side is in the form of a rectangle as shown in FIG. 11, which is one example of a preferred coil assembly 20 made from finned serpentine tubes 122 that is also shown schematically in FIG. 12. Other configurations are of suitable first process coil assemblies 20 are shown in FIGS. 13 and 14.

With reference to FIGS. 11 and 12, the coil assembly 20 preferably is made of multiple generally horizontal closely spaced parallel, serpentine tubes 122 connected at their ends into a number of circuits. Each individual circuit within the coil assembly may be a single, continuous length of coil tubing that is subjected to a bending operation which forms the tubing into several U-shaped rows that are in a generally vertical and equally-spaced relationship from each other, such that each circuit has a resultant serpentine shape. For many uses, finned tube coil assemblies, such as coil assemblies 20, are preferred, and made of finned tubes 122 described in more detail below with reference to FIGS. 15-18, when the coil assemblies are used as evaporative heat transfer cells 12. Where fins are not desired for the coil assemblies, the general orientation, spacing and arrangement may be, without limitation, the same as those described below regarding the finned coil assemblies, except that the fins are omitted.

The serpentine tubes 122 have generally straight sections 124 that have a longitudinal axis 126 (best seen in FIG. 15) connected together by U-shaped return bends 128, sometimes called "bights," formed either by bending a long single tube to form the generally straight sections 124 or by separately attaching the return bends 128 to the generally straight sections, as described more specifically below. The generally straight sections 124 are generally horizontal and closely spaced and arranged in levels in planes generally parallel to the major plane 23 of the coil assembly 20. The coil assembly 20 has an inlet 22 connected to an inlet manifold or header 24, which fluidly connects to inlet ends of the serpentine tubes 122 of the coil assembly, and an outlet 26 connected to an outlet manifold or header 28, which fluidly connects to the outlet ends of the serpentine tubes 122 of the coil assembly. Although the inlet 22 is shown at the top and the outlet 26 is shown at the bottom of the coil assembly 20, the orientation of the inlet and outlet could be reversed, such that the inlet 22 is at the bottom and the outlet 26 is at the top, if desired. The assembled coil assembly 20 may be moved and transported as a unitary structure such that it may be dipped, if desired, if its components are made of steel, in a zinc bath to galvanize the entire coil assembly.

Figure 13:
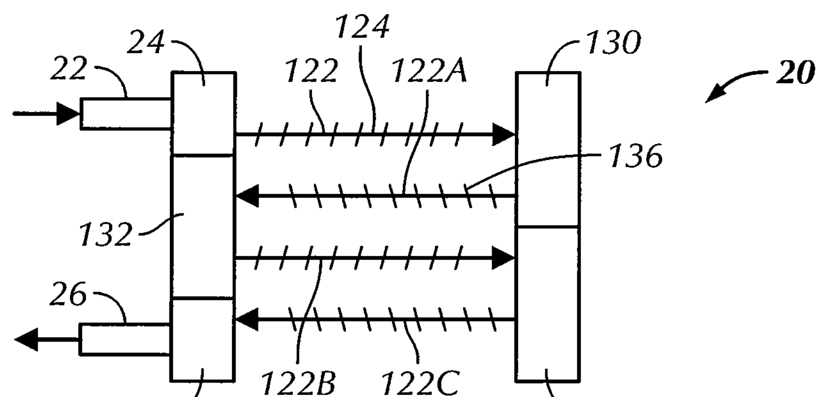
FIG. 13 is a schematic side elevation view of an alternative embodiment of an exemplary first process fluid coil assembly for an evaporative heat transfer cell usable in the apparatus of the present invention.
Figure 14:
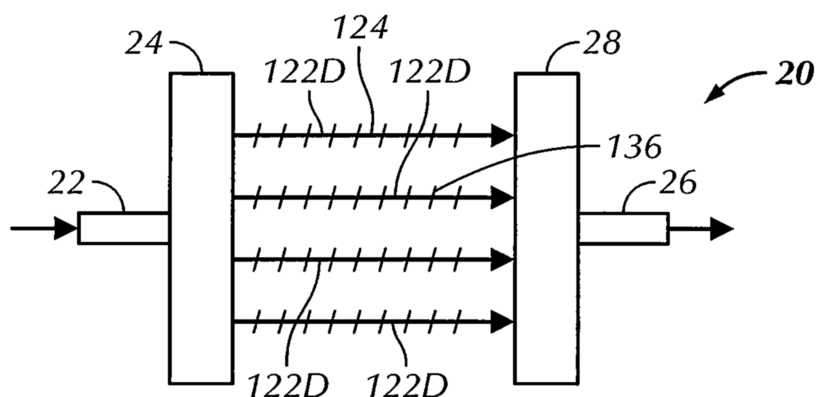
FIG. 14 is a schematic side elevation view of another alternative embodiment of an first process fluid exemplary coil assembly for an evaporative heat transfer cell usable in the apparatus of the present invention.
Figure 15:
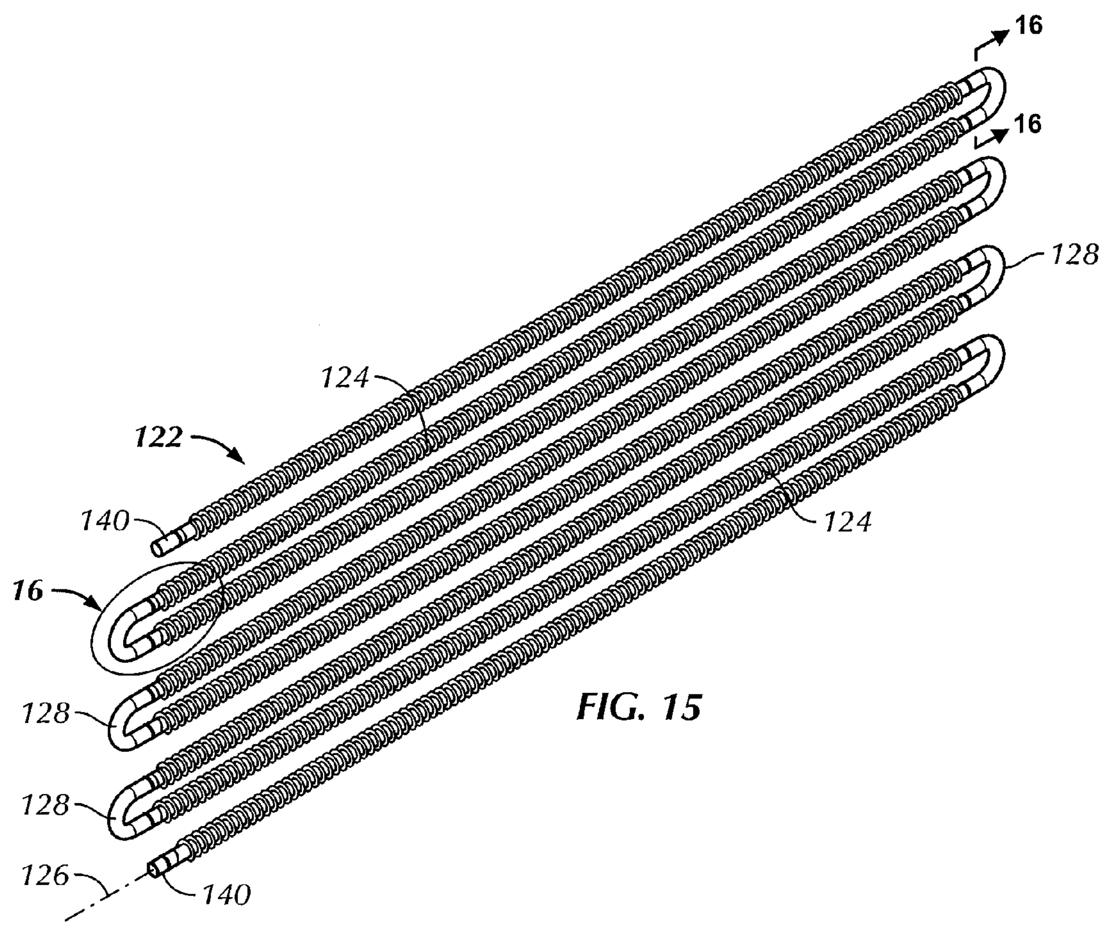
FIG. 15 is an isometric view of one embodiment of a preferred serpentine finned tube that may be used with other such finned tubes in a first process fluid coil assembly of the apparatus of the present invention.

FIG. 13 is a schematic side elevation view of another alternative embodiment of an exemplary first process fluid coil assembly 20 for use as an evaporative heat transfer cell 12 made using the tubes 122, with or without fins, but showing fins, where the tubes 122 are generally straight tubes only having generally straight sections 124, without return bends 128, that extend across the major plane 23 (not shown). In this embodiment, an inlet 22 for the internal heat transfer or process fluid is connected to an inlet manifold or header 24. The internal process fluid flows from the inlet manifold or header 24 into a plurality of tubes 122, one of which is shown in FIG. 13, that are fluidly connected at one end to the inlet manifold or header 24 at an upper level and into a second, upper manifold or header 130 to which the opposite ends of the upper level tubes 122 are fluidly connected. The internal process fluid then flows from the second, upper manifold or header 130 through a lower level of tubes 122A fluidly connected at one end to the second, upper manifold or header 130 into a third, intermediate manifold or header 132 to which the opposite ends of the tubes 122A are fluidly connected. From the third, intermediate manifold or header 132, the internal process fluid flows into a still lower level of tubes 122B which are fluidly connected at one end to the third, intermediate manifold or header 132 to a fourth, lower manifold or header 134 to which the opposite ends of the tubes 122B are fluidly connected. Then the internal fluid flows from the fourth, lower manifold or header 134 to which the one end of the lowest level of the tubes 122C are fluidly connected to an outlet manifold or header 28 to which the opposite ends of the tubes 122C are fluidly connected. An outlet 26 for the internal heat transfer or process fluid is connected to the outlet manifold or header 28. As described above regarding the embodiment of FIGS. 11 and 12, if desired for particular uses, the flow of the internal fluid can be reversed, such that the described inlet 22 would be the outlet and the described outlet 26 would be the inlet.

FIG. 14 is a schematic side elevation view of an alternative embodiment of an exemplary first process fluid coil assembly 20 for use as an evaporative heat transfer cell 12 made using the tubes 122D, with or without fins, but showing the fins, where the tubes 122D are generally straight tubes only having generally straight sections 124, without return bends 128, that extend across the major plane 23 (not shown) and fluidly connect directly at respective opposite ends to an inlet manifold or header 24 and to an outlet manifold or header 28. An inlet 22 for the internal heat transfer or process fluid is connected to the inlet manifold or header 24. An outlet 26 for the internal heat transfer or process fluid is connected to the outlet manifold or header 28. As described above regarding the embodiment of FIGS. 11, 12 and 13, if desired for particular uses, the flow of the internal process fluid can be reversed, such that the described inlet 22 would be the outlet and the described outlet 26 would be the inlet.

The preferred tubes 122 are finned tubes, preferably in the form of the serpentine tubes 122 shown in FIGS. 11 and 12. Accordingly, details of the preferred serpentine finned tubes 122 will now be described with reference to FIGS. 15-18 relating to a single finned tube 122 for the sake of clarity.

For use in the present invention, the type, shape and orientation of the tubes 122, with or without fins 136, in any coil assembly 20 will be determined by the components, capacity and customer requirements of the evaporative heat transfer cell 12 and the overall hybrid heat exchanger apparatus 10, 10', 10" in which they are used. Thus, the tubes 122 in any particular coil assembly 20 used in the present invention may be serpentine tubes 122 as shown in FIGS. 11 and 12, for example, or generally straight tubes 122, 122A, 122B, 122C and 122D as shown in FIGS. 13 and 14, for example. The serpentine tubes 122 may have generally circular or generally elliptical cross-sectional shapes either only in their generally straight sections 124 or also in their return bends 128. The generally straight tubes 122, 122A, 122B, 122C and 122D likewise may have generally circular or generally elliptical cross-sectional shapes. Where the generally straight sections or generally straight tubes are generally elliptical in cross-section, the major axes of the tubes may be generally vertically arranged on generally horizontal levels such that the major axes are generally parallel to each other, either generally vertically, or at an angle or at opposite angles in a "ric-rac" arrangement as described below.

The finned tube 122, preferably is in the form of a serpentine tube having a plurality of generally straight sections 124 that have a longitudinal axis 126 and which are interconnected by return bends 128. The tubes 122 may be made of any heat-conductive metal, such as galvanized steel, stainless steel, copper, aluminum or the like. Stainless steel and galvanized steel, where the zinc is applied to the steel tubes to form galvanized steel after the tubes are assembled into a coil assembly 20, are the presently preferred materials for the tubes 122 for most evaporative heat exchange applications.

The return bends 128 may be integrally and unitarily formed with the generally straight sections 124 to form the tubes 122, but it is considerably easier to include fins 136 on the generally straight sections 124 if the return bends 128, having connector end portions 138, are connected to connector end portions 140 of the generally straight section 124 after the fins 136 are formed on the outer surface of the generally straight sections 124. The connecting end portions 138 of the return bends 128 match the shape and are typically slightly larger in cross-sectional area than the connecting end portions 140 of the generally straight sections 124, such that the connecting end portions 140 of the generally straight sections 124 fit within the connecting end portions 138 of the return bend 128, and may be conveniently substantially sealed in a substantially liquid-tight and preferably substantially gas-tight manner, such as by welding together the connecting end portions 138 and 140. The connecting end portions 138 and 140 may have a generally elliptical cross-sectional shape or preferably, for ease of manufacture and handling, have a generally circular cross-sectional shape, such that the orientation of the connecting end portions 138 and 140 are easier to match together using uniform return bends 128 that preferably have a generally circular cross-sectional shape throughout their curved length from one connecting end portion 138 to the opposite connecting end portion 138. However, if desired, such as for creating a more tightly packed coil assembly of a plurality of generally horizontally arranged tubes 122, the return bends may have a generally elliptical cross-sectional shape, where major axes of the ellipses of the body of the return bends 128 between the connector end portions 138 are oriented in a generally vertical direction, for most applications within an evaporative heat exchanger. It is preferred to connect the return bends 128 to the generally straight sections 124 after the fins 136 have been applied to the generally straight sections 124, for ease of manufacture.

The fins 136 may be serrated, may have undulations or corrugations or may be of any other desired well-known structure. If desired, collars 142 may be integrally and unitarily formed with the fins 136, where the collars 142 provide a direct and secure contact with the surface of the tubes 122 over a greater surface area than if only the edges of the fins 136 were in contact with the outer surface of the tubes 122. The fins 136 and collars 142 may be formed simultaneously on the tubes 122 using commercially available equipment in a manner known to those involved with producing finned tubes, and especially spiral finned tubes. Alternatively, the fins 136, with or without collars 142 may be applied individually onto the outer surface of the tubes 122, and then secured, such as by welding, into place, but this is an expensive and labor intensive manner of applying the fins 136 to the tubes 122.

Preferably, the fins 136 are applied spirally in a continuous manner to the generally straight sections 124 of the tubes 122 by conventional equipment. The fins 136 are formed from a band of metal of the same type as used in for the tubes 122, and the band is fed from a source of the band at a rate and in a manner to spirally wrapped around the generally straight section 124 of the tube 122 as it is advanced longitudinally along and rotated around its longitudinal axis 126 through the spiral fin forming equipment. As the fins 136 are wrapped around the tube 122, the inner radius of the fins 136 buckles while the outer radius does not, which creates minor corrugations or indentations in the fins themselves. This buckling occurs in a regular, repeating process in a left-to-right pattern to form undulations, not shown in FIGS. 16-18.

When used as evaporative heat transfer cells 12, the first process fluid coil assemblies 20 preferably use finned tubes, where the combination of factors of tube shape, orientation, arrangement and spacing, and fin spacing, height and thickness, all of which must be carefully balanced, provide increased heat transfer coefficients with an unexpected relatively low air pressure drop that produces high air volume. The combination of increased heat transfer coefficients with high air volume produces very high heat exchange capacity. The details of all of these parameters are disclosed in U.S. patent application Ser. No. 12/838,303, filed Jul. 16, 2010, the entire subject matter of which is hereby incorporated by reference herein. That application is assigned to Evapco, Inc., as is the present application.

While the preferred embodiments of the first process fluid coil assemblies 20, which may be or are used as evaporative heat transfer cells 12, use finned tubes as disclosed in U.S. patent application Ser. No. 12/838,303, for all of the tubes in the coil assembly to provide the greatest advantages and benefits of the finned tube coil assembly, and are the embodiments described in detail hereinafter, other embodiments of the invention include using at least one finned tube as described herein in a coil assembly 20 together with other, non-finned tubes in such a coil assembly. Preferably a plurality of finned tubes 122, such that at least some, more preferably the majority, and most preferably as mentioned above, all of the tubes in a coil assembly 20 for an evaporative heat transfer cell 12 are finned tubes. When finned tubes are used in such a coil assembly 20 together with non-finned tubes, the finned tubes are used in any desired arrangement of finned and non-finned tubes, but preferably and without limitation, the finned tubes may usually be arranged to be on the top portion of a coil assembly and the non-finned tubes may be on the bottom portion of the coil assembly.

Embodiments of various preferred arrangements of the tubes 122 in a first process fluid coil assembly 20, with reference to the preferred finned tube coil assembly 20 of FIG. 11, using the finned tubes 122 as shown in FIGS. 15-18, will now be described.

As shown, starting from the left-hand side of FIG. 11, every other laterally spaced tube is shown in a preferred orientation as being staggered in height, or vertically, with respect to its next generally horizontally adjacent tubes. FIG. 18 also illustrates an alternative embodiment of the orientation of the major axes of the generally elliptical cross-sectional shape of the generally straight sections 124 of the serpentine tubes 122 used in the coil assemblies 20 as shown in FIG. 11. The orientations of the major and minor axes of the generally elliptical sections 124 should be understood as relating to the entire length of the generally straight sections 124 until they connect with or are unitarily formed with the return bends 128. For ease of explanation, the orientation of the major axes of the generally elliptical, generally straight sections 124 will be described in the preferred embodiment of the serpentine tubes 122 as shown in the embodiment illustrated in FIGS. 11 and 12, but in principle, the same orientation can be and, preferably, is provided for the generally straight sections 124 of the generally elliptical finned tubes 122, 122A, 122B and 122C used in a coil assembly such as the coil assembly 20 schematically shown in FIG. 13, and the generally straight sections 124 of the generally elliptical tubes 122D used in a coil assembly such as the coil assembly 20 schematically shown in FIG. 14. The same orientation and spacing may also be used if the tubes are finned tubes or not finned tubes.

The generally straight sections 124 of adjacent tubes are generally vertically spaced from each other within planes generally parallel to the major plane 23 of the coil assembly 20 at respective upper generally horizontal levels and respective lower generally horizontal levels. Thus, the generally straight sections 124 of horizontally adjacent tubes 122 are in planes generally parallel to the major plane 23 and are staggered and spaced with respect to each other generally vertically to form a plurality of staggered generally horizontal levels in which every other section is aligned in the same generally horizontal level generally parallel to the major plane 23.

In one embodiment, the generally elliptical, generally straight sections 124 have their major axes generally vertically aligned and generally parallel to the plane of the return bends 128 when the tubes 122 are generally vertically oriented as shown in FIG. 18. This alignment or orientation is regardless of whether the sections are on an upper generally horizontal vertical level or a lower horizontal level, such as the next adjacent generally horizontal level.

In another embodiment, the generally elliptical, generally straight sections 124 have their major axes of the tubes 122 on the different, next adjacent generally horizontal levels angled in opposite directions with respect to the plane of the return bends 128 when the tubes 122 are generally vertically oriented as shown in FIG. 18. In a preferred embodiment, the major axes of the generally elliptical, generally straight sections 124 are oriented in opposite directions on adjacent horizontal levels, where the angle of all of the major axes on a first generally horizontal level is about 20° from the plane of the return bends and the angle of all of the major axes on the next adjacent, lower generally horizontal level is about 340° from the plane of the return bends. In this configuration, for each horizontal level the major axes of all of the generally elliptical, generally straight sections 124 are oriented in the same angled direction and on the next adjacent lower level, the major axes of all the generally elliptical, generally straight sections 124 are oriented in the same angled direction, but in an opposite angled orientation from the angled orientation of the major axes in the next adjacent upper level. Where the major axes are angled in opposite directions on adjacent horizontal levels, they are sometimes known as a "ric-rac" arrangement or orientation. FIG. 18 shows the oppositely angled major axes of the finned generally elliptical, generally straight sections 124 as described regarding the ric-rac arrangement for one serpentine tube 122, with respect to fins 136A and 136B, for example. If desired, however, the major axes of the generally elliptical, generally straight sections 124 of horizontally adjacent tubes 122 within the same generally horizontal level may be angled in opposite directions.

Thus, the major axes of the finned or unfinned generally elliptical, generally straight sections 124 on a first generally horizontal level may be 0° to about 25° from the plane of the return bends and the angle of the major axes of the finned or unfinned generally elliptical, generally straight sections 124 on the next adjacent generally horizontal level may be about 335° to 360° from the plane of the return bends.

Where the return bends 128 are generally circular in cross-section, the outside diameter of the circular cross-section of the return bends substantially equals the nominal tube outside diameter that is an average of the lengths of the major and minor axes of the generally straight sections 124 having a generally elliptical cross-section. Preferably, but without limitation, the outside diameter of the return bends and the nominal tube outside dimension are about, and preferably substantially 1.05 inches (2.667 cm), where the wall thickness of the tubes forming the generally straight sections 124 and the return bends 128 is about 0.55 inch (0.14 cm). The minor axis of the generally elliptical tube 122 or generally elliptical, generally straight sections 124 is about 0.5 to about 0.9 times, and preferably about 0.8 times the nominal tube outside diameter. Thus, the minor axis length of the generally elliptical, generally straight sections 124 is about, and preferably substantially 0.525 inch (1.334 cm) to about, and preferably substantially, 0.945 inch (2.4 cm) and preferably about and preferably substantially 0.84 inch (2.134 cm). Tubes 122 with these dimensions have been found to have a good balance among an appropriate inner diameter or dimensions to allow the processing fluid in the form of any desired gas or liquid to easily flow within the tubes 122, proximity of such processing fluid to the tube wall for good heat transfer through the walls of the tubes with the elliptical cross-sectional shape that has a large effective surface area, and ability to provide an appropriate number of tubes 122 to be packed into a coil assembly 20. The tubes are strong, durable and when in serpentine form, able to be readily worked, including connecting the generally straight sections 124 and return bends 128 and placement within a coil assembly 20. Depending on the environment and intended use of the hybrid heat exchangers 10, such as the evaporative heat transfer cells 12 in which the finned tubes 122 are placed, the dimensions and cross-sectional shape of the tubes 122 may be varied considerably.

The spacing and orientation of the tubes 122 having the generally elliptical cross-sectional shape within a first process fluid coil assembly 20 are important factors for the performance of the evaporative heat transfer cell 12 containing the coil assembly 20. If the spacing between the generally straight sections 124 of the tubes 122 is too tight, air and water flow through and turbulent mixing within the coil assembly will be adversely affected, fans with greater horsepower will be needed and there will be an increased pressure drop. If the spacing between the generally straight sections 124 is too great, then there will be less tubes per surface area of the major plane 23 of the coil assembly 20, reducing the heat transfer capacity, and there may be inadequate, as in insufficient mixing of the air and water, for example, adversely affecting the degree of evaporation, and thereby heat exchange. The orientation of the generally straight sections 124, particularly with respect to the angle of the major axes of the sections when the generally straight also are generally elliptical in cross-section, also affects the heat exchange ability of an evaporative heat exchanger with which they are used.

With reference to FIGS. 2-6, 8 and 10, the generally vertical plane of the return bends 128 in the preferred embodiment using finned serpentine tubes 122, as shown in FIGS. 15-18 and as indicated by the generally vertical alignment of the tubes 122 in the coil assemblies 20 as shown in FIGS. 2-6, 8, 10 and 11, are also generally normal to the major plane 23 of the coil assemblies 20 and parallel to the longitudinal axis 19 of the plenum chamber 18. Based on this alignment, the finned generally elliptical, generally straight sections 124, with their longitudinal axes 126, of the tubes 122 are also in generally horizontal staggered planes parallel to the major plane 23 of the coil assemblies 20 and generally normal to the longitudinal axis 19 of the plenum chamber 18. If generally straight finned tubes 122, 122A, 122B, 122C and 122D are used as shown in FIGS. 13 and 14, then the finned tubes with their longitudinal axes also are in generally horizontal staggered planes parallel to the major plane 23 of the coil assemblies 20 and generally normal to the longitudinal axis 19 of the plenum chamber 18.

The center-to-center spacing generally horizontally (which will be generally parallel to the major plane 26 in FIG. 2) and generally normal to the longitudinal axis 126 of the finned generally elliptical, generally straight sections 124 of horizontally adjacent tubes 122 is substantially 100% to substantially 131% of the nominal tube outside diameter, preferably substantially 106% to substantially 118% of the nominal tube outside diameter, and more preferably substantially 112% of the nominal tube outside diameter. The vertical spacing of the horizontally adjacent generally straight sections 124 or generally straight tubes 122 generally is not as critical to the performance of an evaporative heat transfer cell as the horizontal generally straight section or tube spacing described above. The generally straight sections 124 of horizontally adjacent tubes 122 have a generally vertical center-to-center spacing of substantially 110% to substantially 300% of the nominal tube outside diameter, preferably substantially 150% to substantially 205% of the nominal tube outside diameter, and more preferably, substantially 179% of the nominal tube outside diameter.

These parameters may be applied as follows to the presently preferred embodiment of tubes 122 having generally elliptical, generally straight sections 124, where the nominal tube outside diameter is substantially 1.05 inches (2.67 cm). The center-to-center generally horizontal spacing of the finned generally elliptical, generally straight sections 124 would be substantially 1.05 inches (2.67 cm) to substantially 1.38 inches (3.51 cm), preferably substantially 1.11 inches (2.82 cm) to substantially 1.24 inches (3.15 cm), and more preferably substantially 1.175 inches (2.985 cm). The generally elliptical, generally straight sections 124 of the horizontally adjacent finned tubes 122 would have a generally vertical center-to-center spacing of substantially 1.15 inches (2.92 cm) to substantially 3.15 inches (8.00 cm), preferably substantially 1.57 inches (3.99 cm) to substantially 2.15 inches (5.46 cm), and more preferably substantially 1.88 inches (4.78 cm).

The parameters relating to the fins 136, namely fin spacing along the longitudinal axis 126 of the generally straight sections 124, the fin height from the outer surface of the generally straight sections 124 and the fin thickness are as follows according to a preferred embodiment using finned tubes 122 in the first process fluid coil assemblies 20 of the present invention, when they are to be used as evaporative heat transfer cells 12.

The spacing of the fins 136 around the outer surface of the generally straight sections 124 is critical. If the fin spacing is too close (too many fins per inch, for example), the ability of the external heat exchange liquid and the air to effectively mix turbulently is adversely affected and the fins 136 may block the space externally of the coil assembly 20, such that greater air mover power is needed. Similar concerns involve the critical determination of the height of the fins (the distance from the proximal point where the base of the fins 136 contact the outer surface of the generally straight sections 124 and the distal tip of the fins). While higher fins have greater surface area which the evaporating water may coat, longer fins may block the air passage. Thicker fins 136 also have similar critical concerns. Thicker fins are more durable and are better able to withstand the forces of water and air, as well as other material that may be entrained in either as they pass through a coil assembly, but thicker fins may also block the flow of water or air through the coil assembly and would be more expensive to manufacture. All of these factors adversely affect performance.

If the fin spacing is too great (not enough fins per inch, for example), the advantages of a sufficient number of fins 136 for the evaporative water to coat would not be present and there may be an adverse effect on the desired mixing of the water and air responsible for efficient evaporation. Similar concerns are present when the fin height is too low, as there is not enough structure of the fins to be coated with the water, and there may be less mixing of the water and air. Thinner fins may not be sufficiently durable to withstand the hostile environment to which they are subject in evaporative heat exchangers and if the fins are too thin, they could be bent during operation as they are subject to the forces of both the water and air impacting them, adversely affecting flow of both the water and air. In addition, and more significantly, thinner fins transfer less heat.

The fins 136 are preferably spiral fins and have a spacing of substantially 1.5 to substantially 3.5 fins per inch (2.54 cm) along the longitudinal axis 126 of the straight sections 124, preferably substantially 2.75 to substantially 3.25 fins per inch (2.54 cm) and more preferably substantially 3 fins per inch (2.54 cm). Expressed alternatively, the center-to-center distance between the fins 136 is therefore, respectively, substantially 0.667 inch (1.694 cm) to substantially 0.286 inch (0.726 cm), preferably substantially 0.364 inch (0.925 cm) to substantially 0.308 inch (0.782 cm), and more preferably substantially 0.333 inch (0.846 cm).

The fins 136 have a height of substantially 23.8% to substantially 36% of the nominal tube outside diameter, preferably substantially 28% to substantially 33% of the nominal tube outside diameter, and more preferably substantially 29.76% of the nominal tube outside diameter. These parameters may be applied as follows to the presently preferred embodiment, where the nominal tube outside diameter is substantially 1.05 inches (2.667 cm). In this embodiment, the fins 136 have a height of substantially 0.25 inch (0.635 cm) to substantially 0.375 inch (0.953 cm), preferably substantially 0.294 inch (0.747 cm) to substantially 0.347 inch (0.881 cm), and more preferably 0.3125 inch (0.794 cm).

The fins 136 have a thickness of substantially 0.007 inch (0.018 cm) to substantially 0.020 inch (0.051 cm), preferably substantially 0.009 inch (0.023 cm) to substantially 0.015 inch (0.038 cm), and more preferably substantially 0.01 inch (0.025 cm) to substantially 0.013 inch (0.033 cm). As noted above in the “Definitions” section, dimensions for the thickness of the fins are for the fins 136 on the finned tubes 122 prior to any later treatment of the finned tubes themselves or of any coil assembly containing them. Where the finned tubes or coil assembly are subjected to a later treatment, typically by galvanizing steel finned tubes or more typically, galvanizing the entire coil assembly containing them, the thickness of the fins increases by the thickness of the zinc coating applied during galvanization. Also typically, the fins after galvanization are thicker at a base proximal to the outer surface of the tube than at a tip of the fins distal from the outer surface of the tube. Because the fins are thicker after galvanizing, the spacing between the fins is reduced accordingly. Usually this is not of concern with respect to the thermal performance or heat capacity of the evaporative heat exchangers and the rust or other corrosion inhibition of the galvanizing is important in providing the fumed tubes and coil assemblies with greater longevity than if they were not galvanized.

Where the first process coil assemblies 20 functioning as indirect evaporative heat transfer cells of the evaporative heat transfer cells 12 use the finned tubes 122 as described above, the coil assemblies were conceived and developed in view of the foregoing factors of tube shape, orientation, arrangement and spacing, and fin spacing, height and thickness, all of which must be carefully balanced. This was a difficult task requiring considerable testing and experimentation. Based on such work, the appropriate parameters of tube shape, arrangement, orientation and spacing, as well as fin spacing, height and thickness were determined.

Now that the preferred embodiments of finned tubes 122 used in the preferred embodiments of the first process fluid coil assemblies 20 have been described, additional alternative embodiments of the hybrid heat exchangers 10 with different operating modes and arrangements of coil assemblies 20 and other components will be described with reference to FIGS. 1-10.

The hybrid heat exchange apparatus of the first embodiments of the apparatus 10 shown in FIGS. 1-6 and the second embodiment 10' shown in FIGS. 7 and 8 operate in four general modes, with various alternatives, based on the temperature of the water in the sump 68 and the ambient conditions, as follows. Although the second embodiment 10' shown in FIG. 8 is shown in only one particular mode, namely the mode corresponding to the mode of FIG. 6 of the first embodiment of apparatus 10, the other modes of operation of the second embodiment are essentially the same as in the first embodiment illustrated in FIGS. 2-5.

In the first mode, as illustrated in FIG. 2, when the temperature of the ambient air are sufficiently warm that there is little likelihood that the water will freeze, as when, for example, the temperature of the water in the sump is greater than about 33° F. (1.1° C.), and preferably 36° F. (2.2° C.), and ambient conditions of temperature and humidity are such that evaporative heat transfer will be effective, the system controller 108 controls the ambient air flow control device 118 to open the air inlet dampers 42, such that the ambient air bypasses the dry heat transfer cell 14 via the first air passage 39 and flows through the evaporative heat transfer cell 12, including the first process fluid coil assembly 20 with the distributor assembly 92 of cooling water turned on. In this first mode, the apparatus 10 is operating in a wet mode.

In the second mode illustrated in FIG. 3, when the temperature of the ambient air are likely to freeze the water, as when the dry bulb temperature of the air is less than about 20° F. (−6.7° C.), for example, and certainly when it is less than about 10° F. (12.2° C.), the system controller 108 controls the ambient air flow control device 118 to close the air inlet dampers 42, such that the ambient air flows via the second air passage 46 through the second process fluid coil assembly 72 of the dry heat transfer cell 14 and then through the evaporative heat transfer cell 12 with the distributor assembly 92 of cooling water turned off. Thus, in this second mode, the apparatus is operating in a totally dry mode.

Figure 4:
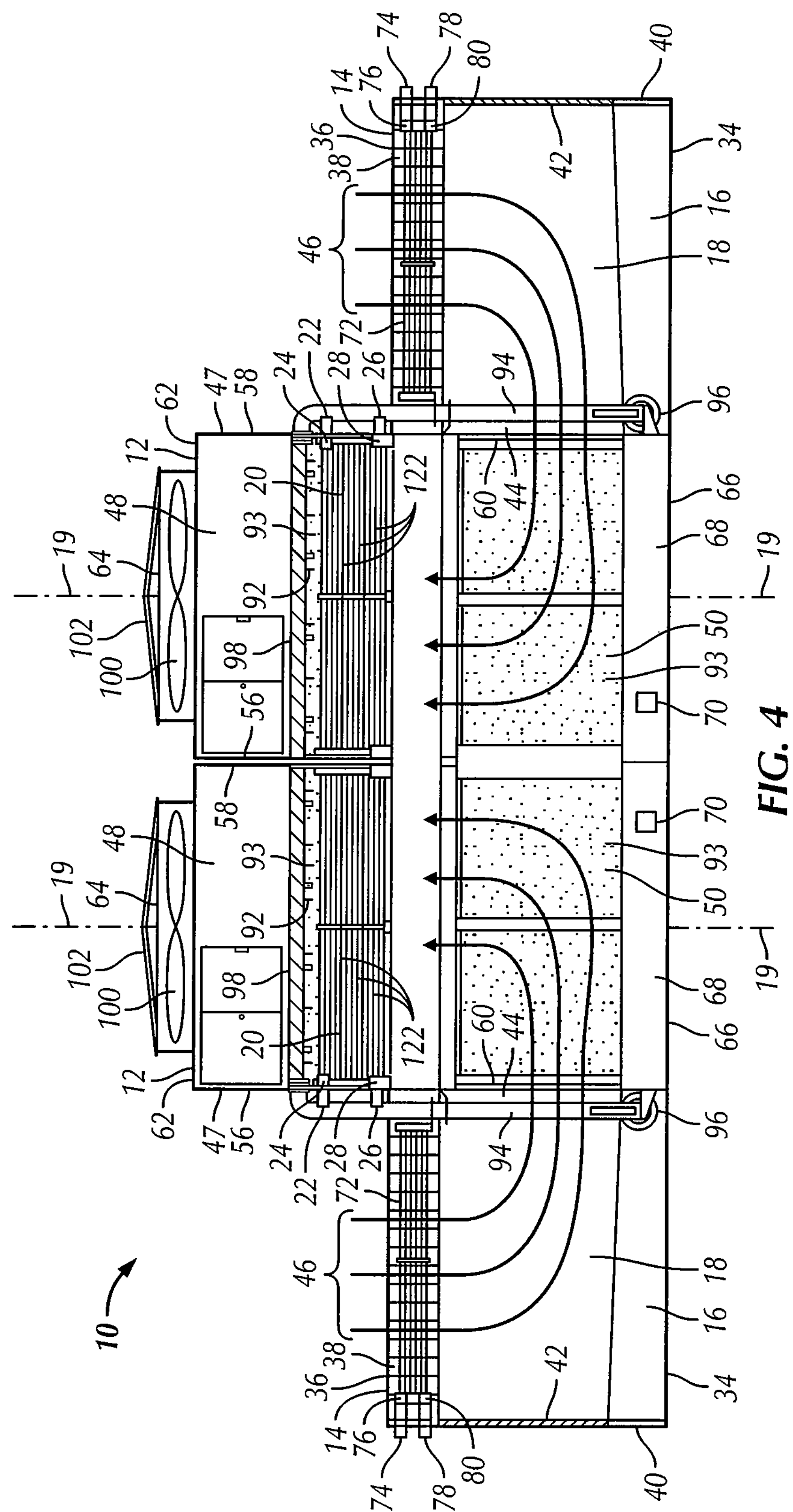

In the third mode, illustrated in FIG. 4, when the temperature of the ambient air is warmer than in the second mode, such that the water is less likely to freeze, and ambient conditions of temperature and humidity are such that evaporative heat transfer and dry heat transfer will be effective, the system controller 108 controls the ambient air flow control device 118 to close the air inlet dampers 42, such that the ambient air flows via the second air passage 46 through the second process fluid coil assembly 72 of the dry heat transfer cell 14, increasing the temperature of the ambient air within the apparatus 10 such that the water distribution 93 used as the cooling liquid in the evaporative heat transfer cells 12 is heated by the heated air passing though the first process fluid coil assembly 20 of the evaporative heat transfer cell 12 with the distributor assembly 92 of cooling water turned on. In this mode, the apparatus 10 is operating in a wet mode, after some dry heat transfer to the air in air passage 46 which heats the air as is passes through the first process fluid coil assembly operating in a wet mode so that the water distribution 93, even subjected to evaporative cooling, is not likely to freeze either on the way through the apparatus 10 or in the sump 68.

In a first alternative of the fourth mode, illustrated in FIG. 5, when the temperature of the ambient air is warmer than in the third mode, and ambient conditions of temperature and humidity are such that evaporative heat transfer and dry heat transfer will be effective, the system controller 108 controls the ambient air flow control device 118 to open the air inlet dampers 42 partially, such that some of the ambient air passes via the second air passage 46 through the second process fluid coil assembly 72 of the dry heat transfer cell 14 and some of the ambient air bypasses the second process fluid coil assembly 72 of the dry heat transfer cell 14 via the first air passage 39, where the ambient air passing through the second process fluid coil assembly 72 of the dry heat transfer cell 14 increases in temperature, such that when mixed in the plenum chamber 18 with the ambient air bypassing the dry heat transfer cell 14, the temperature of the mixed ambient air is increased so that the cooling liquid is not likely to freeze, and the mixed ambient air then flows through the first process fluid coil assembly 20 of the evaporative heat transfer cell 12 with the distributor assembly 92 of cooling water turned on. In this mode the apparatus 10 is operating in a wet mode but also with some dry heat transfer.

A second alternative of the fourth mode, illustrated in FIG. 6, involves at least two evaporative heat transfer cells 12, preferably adjacent each other, each being in air flow communication with a respective dry heat transfer cell 14 where the plenum chamber 18 is in fluid communication with the evaporative heat transfer cells 12 and the dry heat transfer cells 14. This alternative, like the first alternative of the fourth mode, may be used when the temperature of the ambient air is warmer than in the third mode and ambient conditions of temperature and humidity are such that evaporative heat transfer and dry heat transfer will be effective. Here, the system controller 108 controls the ambient air flow control device 118 to close some of the air inlet dampers 42 such that some air flows through the second process fluid coil assembly 72 of some of the dry heat transfer cells 14 via the second air passage 46, whereby this air is heated. The system controller 108 also controls the ambient air flow control device 118 to open some of the air inlet dampers 42 such that some air bypasses the second process fluid coil assembly 72 of others of the dry heat transfer cells 14 via the first air passage 39. The air flowing from the second air passage 46 flows through the first process fluid coil assembly 20 of the associated evaporative heat transfer cell 12 with the distributor assembly 92 of cooling water turned off. The air flowing from the first air passage 39 flows through the first process fluid coil assembly 20 of the associated evaporative heat transfer cell 12 with the distributor assembly 92 of cooling water turned on. The air heated by the dry, second process fluid cells 14 is heated sufficiently that when it mixes in the plenum chamber 18 with the air bypassing the second process fluid cells 14 on the way to and through the first process fluid coils 20 in the evaporative heat transfer cells 12, water distribution 93 is heated enough to avoid freezing while traveling through the apparatus 10 to the sump 68. In this mode the apparatus 10 is operating in a partially wet mode, such that some of the liquid distributors 92 are turned on and some turned off, and where there is some dry heat transfer involved.

The third alternative embodiment of the hybrid heat exchange apparatus 10" of the present invention, shown in FIGS. 9 and 10, will now be described. Unless otherwise described specifically regarding this third embodiment of the apparatus 10", the components and operation may be the same as described above regarding the first two embodiments of the apparatus 10 and 10'.

The apparatus 10" is shown in FIGS. 9 and 10 as including two evaporative heat transfer cells 12 and two dry heat transfer cells 14, although any number of each of such cells may be used. The description will be with respect to an embodiment including one evaporative heat transfer cell 12 and one dry heat transfer cell 14, but still with reference to FIGS. 9 and 10, where the cross-section view of FIG. 2 shows one evaporative heat transfer cell 12 adjacent to and in fluid communication with a dry heat transfer cell 14 on the opposite sides of the evaporative heat transfer cell 12. The plenum chamber housing 16, as in the other embodiments, includes a front wall 30, a back wall 32, a bottom wall 34, a top wall 36 with openings 38 to allow air to flow through a second air passage 46, and an outside side wall 40.

Selectively openable and closeable ambient air inlet dampers 42 are formed in the side wall 40, but as before, they could be in the form of manually blockable open louvers, and also as before, the term "selectively openable and closeable ambient air inlet dampers" and variations thereof as used herein include such open, blockable louvers. Opposite the side wall 40, the plenum chamber 18 has an open side 44 in fluid communication with the plenum chamber in the interior of the evaporative heat transfer cell 12, as explained above. The second process fluid coil assembly 72 is mounted in the top of the plenum chamber 18 of the dry heat transfer cell 14 such that the air passes via an air passage 105 from the ambient atmosphere through the openings 38 in the top wall 36 then externally through the second process fluid coil assembly 72 and into the plenum chamber 18. As with the other embodiments, other configurations of the location of the second process fluid coil assembly 72 within the plenum chamber housing 16 are readily available as desired, so long as the air passages are maintained either through or bypassing the second fluid coil assembly.

The evaporative heat transfer cell 12 has a housing 47, including an upper portion 48 and a lower portion 50. The housing 47 also has a front wall 52, a back wall 54, a left side wall 56, a right side wall 58 with openings 60 in the lower portion 50 of both side walls, as well as a top wall 62. The top wall 62 includes an air outlet 64, which may be in a raised area surrounding an induced draft fan 100.

There are at least one, and as shown in FIG. 10, two first process fluid coil assemblies 20 mounted in the upper portion 48 of the evaporative heat transfer cell 12. A bottom wall 66 of the evaporative heat transfer cell 12, together with the adjoining front, back and side walls defines a sump 68 for the cooling water. If desired, a drain pipe with an appropriate valve and a fill pipe with an appropriate valve (none of which is shown) may be included for draining and filling or replenishing the sump 68. A temperature sensor 70 (two of which are shown in FIG. 10) senses the temperature of the water in the sump 68. Water in the sump 68 is circulated to a selectively operable cooling liquid distributor assembly 92 as in the first embodiment 10, which when turned on, creates a distribution 93 of water as the evaporative cooling liquid above the first process fluid coil assembly 20. The distributor assembly 92 distributes water over the first process fluid coil assembly 20 and, guided by walls 95, over the wet deck fill direct contact heat transfer media 104 located in the lower portion 50 of the evaporative heat transfer cell 12 below each of the first process fluid coil assemblies 20. The distributor assembly 92 is connected to one end of a conduit 94 in fluid connection at the other end to the water in the sump and typically is turned on when a pump 96 is turned on to pump water from the sump 68 to the distributor assembly 92 through the conduit 94.

The evaporative heat transfer cell 12 also includes drift eliminators 98 downstream of the air flow through a third air passage 101 (two of which are shown in FIG. 10) by which ambient air is drawn externally through the first process fluid coil assemblies 20. The ambient air enters the third air passage 101 through an inlet splash guard and sunlight blocker 99, which may be in the form of the drift eliminators 98, described above. Air, which may be laden with water from the distributor assembly 92 before passing through the drift eliminators 98, then flows via the third air passage 101 out the outlet 64. A grating or screen 102 is placed over the fan 100 for safety and to keep debris away from the fan 100 and out of the evaporative heat transfer cell 12.

Preferably, the plenum chamber front wall 30 is coextensive with the evaporative heat transfer cell front wall 52. Preferably, the plenum chamber back wall 32 is coextensive with the evaporative heat transfer cell back wall 54. With this exemplary construction, as with any other suitable construction, there is fluid communication between the evaporative heat transfer cell 12 and the dry heat transfer cell 14. The evaporative heat transfer cell 12 and the associated dry heat transfer cells 14 form a unit that is substantially airtight, as defined above, from extraneous air flow other than air passing through the third air passage 101 as well as through a fourth air passage 103 (corresponding to the first air passage 39 of the embodiments of the apparatus 10 and 10') and/or a fifth air passage 105 (corresponding to the second air passage 46 of the embodiments of the apparatus 10 and 10') and out through the outlet 64 as follows. The openings 60 in the lower portion 50 of the side walls 56 and 58 of the evaporative heat transfer cell 12 communicate with the open sides 44 of the plenum chambers 18 to create an air flow path from the plenum chamber 18 through the plenum chamber in the lower portion 50 of the evaporative heat transfer cell 12. The fan 100 is shown as a propeller fan and is preferred for use as an induced draft fan to draw air from the ambient atmosphere via the third air passage 101 through the first process fluid coil assembly 20 as described above. The fan 100 also draws ambient air via the fourth air passage 103 and/or via the fifth air passage 105 through the open sides 44 of the plenum chamber 18, the openings 60 in the lower portion 50 of the evaporative heat transfer cell 12, through the direct contact evaporative heat exchanger in the form of the direct contact heat transfer media 104, which may or may not be subject to water distribution 93 from the distributor assembly 92 which may or may not be turned on, and out the outlet 64 to the ambient atmosphere.

Like the first two embodiments of the apparatus 10' and 10", the apparatus 10" is operable as a condenser or as a cooler and in four modes. The control of the process fluid is as described above regarding apparatus 10. The manual and automatic control systems for the apparatus 10" are also as described above regarding apparatus 10.

The modes of operation, depending on the ambient temperature and humidity and the temperature of the water in the sump 68 are as follows, with the understanding that some ambient air always flows via the third air passage 101 externally through the first process fluid coil assembly 20, regardless of the flow of other of the ambient air as described below in any of the modes. All modes are described with reference to FIG. 10. The right side of FIG. 10 shows air bypassing the second process fluid coil assembly 72, instead flowing via the fourth air passage 103 from the ambient atmosphere through the open air inlet dampers 42, then through the direct contact evaporative heat exchanger in the form of the direct contact heat transfer media 104, then out through the outlet 64 without passing through the first process fluid coil assembly 20. The left side of FIG. 10 shows air flowing via the fifth air passage 105 from the ambient atmosphere externally through the second process fluid coil assembly 72, when the air inlet dampers 42 are closed, with the air then passing through the direct contact evaporative heat exchanger in the form of the direct contact heat transfer media 104, then out through the outlet 64 without passing through the first process fluid coil assembly 20. The air flowing through the direct contact evaporative heat exchanger in the form of the direct contact heat transfer media 104 via the fourth air passage 103 and/or the fifth air passage 105 will act to cool the water by evaporative cooling, if any water is flowing in the direct contact evaporative heat exchanger in the form of the direct contact heat transfer media 104 via the distributor assembly 92. Thus, FIG. 10 may be considered to schematically represent a composite of various air flow passages when the apparatus 10" is operating in various modes described below, as well as the second alternative of the fourth mode that FIG. 10 specifically illustrates. In each of the modes, the control may be manual or preferably automatic using the system controller 108 as described above.

In the first mode, when the temperature of the ambient air is sufficiently warm that there is little likelihood that the cooling water will freeze, as when, for example, the temperature of the water in the sump is greater than about 33° F. (1.1° C.), and preferably 36° F. (2.2° C.), and ambient conditions of temperature and humidity are such that evaporative heat transfer will be effective, the system controller 108 controls the ambient air flow control device 118 to open the air inlet dampers 42, such that the ambient air bypasses the dry heat transfer cell 14 via the fourth air passage 103 through the direct contact evaporative heat exchanger in the form of the direct contact heat transfer media 104 in the evaporative heat transfer cell 12 with the distributor assembly 92 of cooling water turned on to evaporatively cool the cooling water. This is a fully wet mode of operation.

In the second mode, when the temperature of the ambient air is likely to freeze the water, as when the dry bulb temperature of the air is less than about 20° F. (−6.7° C.), for example, and certainly when it is less than about 10° F. (−12.2° C.), the system controller 108 controls the ambient air flow control device 118 to close the air inlet dampers 42, such that the ambient air flows via the fifth air passage 105 through the second process fluid coil assembly 72 of the dry heat transfer cell 14 where the air is heated and then through the direct contact evaporative heat exchanger in the form of the direct contact heat transfer media 104 in the evaporative heat transfer cell 12 with the distributor assembly 92 of cooling water shut off. This is a fully dry mode of operation.

In the third mode, when the temperature of the ambient air is warmer than in the second mode, such that the water is less likely to freeze, and ambient conditions of temperature and humidity are such that evaporative heat transfer and dry heat transfer will be effective, the system controller 108 controls the ambient air flow control device 118 to close the air inlet dampers 42, such that the ambient air flows via the fifth air passage 105 through the second process fluid coil assembly 72 of the dry heat transfer cell 14 and then through the direct contact evaporative heat exchanger in the form of the direct contact heat transfer media 104 in the evaporative heat transfer cell 12 with the distributor assembly 92 of cooling water turned on. In this mode, the ambient air is heated in the dry transfer heat transfer cell 14, and the heated air helps keep the water from freezing and aids in evaporative cooling of the cooling water in the direct contact evaporative heat exchanger in the form of the direct contact heat transfer media 104, such that cooler water is collected in the sump 68.

In the fourth mode generally, when the temperature of the ambient air is warmer than in the third mode, and ambient conditions of temperature and humidity are such that evaporative heat transfer and dry heat transfer will be effective, the system controller 108 controls the ambient air flow control device 118 to open the air inlet dampers 42 partially or some of the air inlet dampers 42 are open and some are closed, such that some of the ambient air passes via the fifth air passage 105 through the second process fluid coil assembly 72 of the dry heat transfer cell 14 where it is heated, and some of the ambient air bypasses the second process fluid coil assembly 72 of the dry heat transfer cell 14 via the fourth air passage 103. The air passing via the fifth air passage 105 through the dry heat transfer cell 14 then flows through the direct contact evaporative heat exchanger in the form of the direct contact heat transfer media 104 in the evaporative heat transfer cell 12 with the distributor assembly 92 of cooling water turned on is mixed with the air bypassing the dry heat transfer cell 14 via the fourth air passage 103, where the mixed air is heated. The mixed ambient air then flows through the direct contact evaporative heat exchanger in the form of the direct contact heat transfer media 104 in the evaporative heat transfer cell 12 with the distributor assembly 92 of cooling water turned on. The ambient air bypassing the dry heat transfer cell 14 then passes through the direct heat transfer media 104 in the evaporative heat transfer cell with the distributor assembly of cooling liquid turned on. The heated ambient air passing through the dry heat transfer cell 14, when mixed with the ambient air bypassing the dry heat transfer cell 14, increases the temperature of the mixed ambient air. In this mode, the ambient air is heated in the dry transfer heat transfer cell 14, and the heated air helps keep the water from freezing and aids in evaporative cooling of the cooling water in the direct contact evaporative heat exchanger in the form of the direct contact heat transfer media 104, such that cooler water is collected in the sump 68.

In a preferred first alternative of the fourth mode, the system controller 108 controls the ambient air flow control device 118 to open the air inlet dampers 42 partially, such that some of the ambient air passes via the fifth air passage 105 through the second process fluid coil assembly 72 of the dry heat transfer cell 14 and some of the ambient air bypasses the second process fluid coil assembly 72 of the dry heat transfer cell 14 via the fourth air passage 103, and such that the portions of the ambient air passing through and bypassing the dry heat transfer cell 14 then flow through the direct contact evaporative heat exchanger in the form of the direct contact heat transfer media 104 of the evaporative heat transfer cell 12 with the distributor assembly 92 of cooling water turned on, after which they are mixed and flow though the outlet 64.

In a second alternative of the fourth mode, illustrated in FIG. 10, the system controller 108 controls the ambient air flow control device 118 to close some of the air inlet dampers 42 such that the air flows through the second process fluid coil assembly 72 of some of the dry heat transfer cells 14 via the fifth air passage 105, shown on the left side of FIG. 10. The system controller 108 also controls the ambient air flow control device 118 to open some of the air inlet dampers 42 such that the air bypasses the second process fluid coil assembly 72 of others of the dry heat transfer cells 14 via the fourth air passage 103, shown on the right side of FIG. 10. The air flowing from the fourth air passage 103 and the fifth air passage 105 then respectively flows through the direct contact evaporative heat exchanger in the form of the direct contact heat transfer media 104 of the evaporative heat transfer cell 12 with the distributor assembly 92 of cooling water turned on. The air flows are then mixed and flow though the outlet 64.

Other alternatives to the various embodiments of the operation of the hybrid heat exchange apparatus 10, 10' and 10" of the present invention may be practiced based on the temperature of the water in the sump 68 and the ambient atmospheric conditions, to prevent or at least minimize freezing of water, to optimize the heat transfer, to control the use of water and to control the energy required to operate the apparatus, based on adjusting the variables for controlling the air flow and the process fluid flow, as well as the distributor assemblies 92. Components and the operation of the heat exchange apparatus 10 are sufficiently adjustable that efficiency of heat exchange in all climates and weather conditions may be accomplished with the present invention.

In all embodiments of the hybrid heat exchange apparatus of the present invention, regardless of their particular configurations, it is important that the dry heat transfer cell or cells 14 with its or their dry second process fluid coil assembly or assemblies 72 be located upstream from the evaporative heat exchangers, either in the form of the evaporative heat transfer cells 12 containing the first process fluid coil assembly or assemblies 20, or in the form of the direct contact evaporative heat exchanger, such as the direct contact heat transfer media 104, that the air flows through. This is so that the appropriate amount of heated ambient air that may selectively flow through the dry heat transfer cells 14 may be preheated by the dry heat transfer cells 14, if desired, before flowing through either or both of the evaporative heat transfer cells 12 with the first process fluid coil assembly or assemblies 20 operating as indirect evaporative heat transfer cells and the direct contact evaporative heat exchanger in the form of the direct contact heat transfer media 104, if such media is present, to adequately warm the air in the evaporative heat transfer cells 12 and thus, any water flowing through the evaporative heat transfer cells 12. This prevents or at least minimizes the freezing of the water in the hybrid heat exchange apparatus, aids in the evaporative heat transfer and helps to reduce or eliminate a plume of moisture-laden or humid air exiting the apparatus.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hybrid heat exchange apparatus for indirectly transferring heat between a process fluid and ambient air, the apparatus comprising an evaporative heat transfer cell operative in a wet or dry mode; an indirect dry heat transfer cell that is only operable in a dry manner and is located upstream in an air flow when air flows through the indirect dry heat transfer cell and the evaporative heat transfer cell; and a fan for causing air to flow from the ambient atmosphere through the apparatus; the apparatus being manually or automatically controllable for turning on or off a distributor assembly of cooling liquid in the evaporative heat transfer cell and for controlling air flow through a first air passage to bypass the dry heat transfer cell to flow through the evaporative heat transfer cell, or through a second air passage through the dry heat transfer cell and then through the evaporative heat transfer cell, or to partially bypass the dry heat transfer cell through the first air passage and partially flow through the second air passage, any air flowing through the first or second air passage then flowing through the evaporative heat transfer cell, the dry heat transfer cell being upstream of the evaporative heat transfer cell;

the evaporative heat transfer cell comprising an indirect evaporative heat transfer cell with a first process fluid coil assembly through which the process fluid flows internally within the first process fluid coil assembly and which air must flow externally through in all modes and including a first process fluid inlet header and a first process fluid outlet header; the distributor assembly for selectively distributing cooling liquid from a source externally over the first process fluid coil assembly; and the fan for moving air externally through the first process fluid coil assembly and the apparatus;

the dry heat transfer cell comprising a second process fluid coil assembly through which the process fluid may selectively flow internally within the second process fluid coil assembly and air may selectively flow externally through the second process fluid coil assembly, the second process fluid assembly including a second process fluid inlet header and a second process fluid outlet header;

the apparatus being operable in first, second, third and fourth modes;

wherein in the first mode, selectively openable and closeable air inlet dampers are open, such that the ambient air bypasses the dry heat transfer cell and flows directly through the evaporative heat transfer cell with the distributor assembly of cooling liquid turned on;

wherein in the second mode, the air inlet dampers are closed, such that the ambient air flows first through the dry heat transfer cell and then directly through the evaporative heat transfer cell with the distributor assembly of cooling liquid turned off;

wherein in the third mode, the air inlet dampers are closed, such that the ambient air flows first through the dry heat transfer cell, increasing the temperature of the ambient air to provide heated air, and then directly through the evaporative heat transfer cell with the distributor assembly of cooling liquid turned on; and wherein in the fourth mode, the air inlet dampers are partially open, such that first, some of the ambient air passes through the dry heat transfer cell and some of the ambient air bypasses the dry heat transfer cell, and such that the ambient air passing through the dry heat transfer cell, when mixed with the ambient air bypassing the dry heat transfer cell, increases the temperature of the mixed ambient air to provide heated mixed ambient air, and the heated mixed ambient air then directly flows through the evaporative heat transfer cell with the distributor assembly of cooling liquid turned on.

2. The hybrid heat exchange apparatus of claim 1, further comprising a plurality of evaporative heat exchange cells.

3. The hybrid heat exchange apparatus of claim 1, further comprising a plurality of dry heat exchange cells.

4. The hybrid heat exchange apparatus of claim 1, further comprising a plurality of dry heat exchange cells and a plurality of evaporative heat exchange cells.

5. The hybrid heat exchange apparatus of claim 1, wherein the dry heat transfer cell and the evaporative heat transfer cell are within a housing.

6. The hybrid heat exchange apparatus of claim 5, wherein the housing comprises a housing of the evaporative heat transfer cell in fluid communication within a housing of a plenum chamber for the first and second air passages where the fluid communication is substantially airtight except for air flow inlets and air flow outlets.

7. The hybrid heat exchange apparatus of claim 5, wherein the dry heat transfer cell is mounted within a top portion of a housing for a plenum chamber that comprises front and rear walls, top and bottom walls, a side wall and an open side opposite the side wall, the second process fluid coil assembly of the dry heat transfer cell being located below the top wall, wherein the top wall has openings for an inlet to the second air passage for air to flow through the openings and externally through the second process fluid coil assembly the side wall contain ng the openable and closeable air inlet dampers for controlling the air flow through the first air passage which bypasses the second process fluid coil assembly; and wherein the evaporative heat transfer cell is mounted in a housing having an upper portion and a lower portion the first process fluid coil assembly being located in the upper portion, the evaporative heat transfer cell housing comprising front and rear walls, opposed side walls and top and bottom walls, the top wall of the evaporative heat transfer cell housing including an air outlet above the first process fluid coil assembly, one of the side walls having an opening in the lower portion in fluid communication with the first and second air passages through the open side of the plenum chamber housing, the front and rear walls of the plenum chamber housing being coextensive with the front and rear walls, respectively, of the evaporative heat transfer cell housing;

whereby when the air inlet dampers are closed, air flows through the top openings of the plenum chamber housing the dry heat transfer cell, through the inlet for the second air passage, through the second process fluid coil assembly, through the open side of the plenum chamber housing, through the opening in the side wall lower portion of the evaporative heat transfer cell housing, through the first process fluid coil assembly and out the outlet of the evaporative heat transfer cell housing; and whereby when the air inlet dampers are open, air flows through the air inlet dampers for the first air passage, bypassing the second process fluid coil assembly, through the open side of the plenum chamber housing, through the opening in the side wall lower portion of the evaporative heat transfer cell housing, through the first process fluid coil assembly and out the outlet of the evaporative heat transfer cell housing.

8. The heat exchange apparatus of claim 7, wherein the fan for the apparatus is an induced draft air fan located upstream of the air outlet and downstream of the first process fluid coil assembly in the evaporative heat transfer, cell to induce air flow through at least one of the first and second air passages of the plenum chamber, into the evaporative heat transfer cell, through the first process fluid coil assembly and out the air outlet.

9. The hybrid heat exchange apparatus of claim 1, wherein the second process fluid coil assembly of the dry heat transfer cell 1 comprises a finned tube coil assembly.

10. The hybrid heat exchange apparatus of claim 1, wherein the evaporative heat transfer cell further comprises:

an air outlet downstream of the first process fluid coil assembly;

the fan for the apparatus in the form of an induced draft air fan located upstream of the air outlet to induce air flow through at least one of the first and second air passages;

drift eliminators located between the first process fluid coil assembly and the fan to reduce mist of the cooling liquid from flowing through the air outlet;

a sump to contain the cooling liquid;

a conduit connecting the sump to the distributor assembly, and a pump to pump the cooling liquid from the sump to the distributor assembly through the conduit connecting the sump to the distributor assembly.

11. The hybrid heat exchange apparatus of claim 10, wherein the evaporative heat transfer cell further comprises direct contact heat transfer media for intermixing the cooling liquid and the air flowing through the evaporative heat transfer cell, the heat transfer media being located below the distributor assembly and above or below the first process fluid coil assembly.

12. The hybrid heat exchange apparatus of claim 1, wherein the fan is located downstream of the air inlet dampers and the second process fluid coil assembly and upstream of the first process fluid coil assembly, whereby the air is drawn through the air inlet dampers when the air inlet dampers are open and through the second process fluid coil assembly when the air inlet dampers are closed, and whereby the air is thereafter forced through the first process fluid coil assembly.

13. The hybrid heat exchange apparatus of claim 1, operating as a condenser of the process fluid, wherein the process fluid is separated to flow in parallel through the first process fluid coil assembly of the evaporative heat transfer cell and through the second process fluid coil assembly of the dry heat transfer cell.

14. The hybrid heat exchange apparatus of claim 1, operating as a cooler of the process fluid, wherein the process fluid is separated to flow in parallel through the first process fluid coil assembly of the evaporative heat transfer cell and through the second process fluid coil assembly of the dry heat transfer cell.

15. The hybrid heat exchange apparatus of claim 1, operating as a cooler of the process fluid, wherein the process fluid flows first through the second process fluid coi assembly of the dry heat transfer cell and then through the first process fluid coil assembly of the evaporative heat transfer cell.

16. The hybrid heat exchange apparatus of claim 1, wherein the first process fluid coil assembly comprises a plurality of tubes, where the tubes have at least one generally straight section with a generally elliptical cross-sectional shape and with an outer surface, wherein fins are located on the outer surface of the generally straight section of at least some of the tubes.

17. The hybrid heat exchange apparatus of claim 16, wherein the generally straight section of the tubes has a longitudinal axis and a nominal tube outside diameter, wherein the fins have a spacing of 1.5 to 3.5 fins per inch (2.54 cm) along the longitudinal axis of the straight section of the tubes, the fins having a height extending from the outer surface of the straight section of the tubes a distance of substantially 23.8% to substantially 36% of the nominal tube outside diameter, the fins having a thickness of substantially 0.007 inch (0.018 cm) to substantially 0.020 inch (0.051 cm), the tubes having a center-to-center spacing generally horizontally and generally normal to the longitudinal axis of the straight section of the tubes of substantially 100% to substantially 131% of the nominal tube outside diameter, and the horizontally adjacent straight section of the tubes having a generally vertical center-to-center spacing of substantially 110% to substantially 300% of the nominal tube outside diameter.

18. The hybrid heat exchange apparatus of claim 16, wherein the plurality of tubes are serpentine tubes wherein, except for the inlet and outlet ends, the straight sections are connected to each other by return bends, and wherein fins are located on the outer surface of the generally straight sections of at least a majority of the tubes.

19. The hybrid heat exchange apparatus of claim 18, wherein the generally straight sections of the tubes have a longitudinal axis and a nominal tube outside diameter, wherein the fins have a spacing of 1.5 to 3.5 fins per inch (2.54 cm) along the longitudinal axis of the straight sections of the tubes, the fins having a height extending from the outer surface of the straight sections of the tubes a distance of substantially 23.8% to substantially 36% of the nominal tube outside diameter, the fins having a thickness of substantially 0.007 inch (0.018 cm) to substantially 0.020 inch (0.051 cm), the tubes having a center-to-center spacing generally horizontally and generally normal to the longitudinal axis of the straight sections of the tubes of substantially 100% to substantially 131% of the nominal tube outside diameter, and the horizontally adjacent straight sections of the tubes having a generally vertical center-to-center spacing of substantially 110% to substantially 300% of the nominal tube outside diameter.

* * * * *